(12) United States Patent
Notani

(10) Patent No.: US 10,574,453 B2
(45) Date of Patent: Feb. 25, 2020

(54) SYSTEM AND COMPUTER PROGRAM PRODUCT FOR CERTIFIED CONFIDENTIAL DATA COLLABORATION USING BLOCKCHAINS

(71) Applicant: Ranjit Notani, Plano, TX (US)

(72) Inventor: Ranjit Notani, Plano, TX (US)

( * ) Notice: Subject to any disclaimer, the term of this patent is extended or adjusted under 35 U.S.C. 154(b) by 177 days.

(21) Appl. No.: 15/866,460

(22) Filed: Jan. 10, 2018

(65) Prior Publication Data

US 2019/0215159 A1 Jul. 11, 2019

(51) Int. Cl.
*H04L 9/08* (2006.01)
*H04L 9/06* (2006.01)
*G06Q 20/36* (2012.01)
*H04L 9/32* (2006.01)

(52) U.S. Cl.
CPC ......... *H04L 9/0877* (2013.01); *G06Q 20/367* (2013.01); *H04L 9/0643* (2013.01); *H04L 9/0863* (2013.01); *H04L 9/3247* (2013.01)

(58) Field of Classification Search
CPC ... H04L 9/0877; H04L 9/0643; H04L 9/0863; H04L 9/3247; G06Q 20/367
See application file for complete search history.

(56) References Cited

U.S. PATENT DOCUMENTS

| | | | | |
|---|---|---|---|---|
| 2018/0018723 A1* | 1/2018 | Nagla | ............... | G06Q 20/4014 |
| 2018/0158054 A1* | 6/2018 | Ardashev | ............. | G06Q 20/389 |
| 2018/0315055 A1* | 11/2018 | Pickover | ............. | G06Q 30/016 |
| 2019/0013934 A1* | 1/2019 | Mercuri | ................ | G06Q 20/02 |
| 2019/0074962 A1* | 3/2019 | Ateniese | ............. | G06F 16/1805 |
| 2019/0098013 A1* | 3/2019 | Wilkinson | ............ | H04L 63/107 |
| 2019/0164153 A1* | 5/2019 | Agrawal | ............. | G06Q 20/383 |
| 2019/0222575 A1* | 7/2019 | Oberhauser | ........ | G07C 9/00134 |

\* cited by examiner

*Primary Examiner* — Baotran N To
(74) *Attorney, Agent, or Firm* — Karl L. Larson

(57) ABSTRACT

A method for providing certified confidential data collaboration between untrusted parties, including creating a changeset proposal remotely performing a certified operation and passing the changeset proposal to the certified operation, creating a unique changeset reference validating the changeset proposal and creating a state-at-changeset structure extracting a section-state-at-changeset structure from the changeset proposal, performing a cryptographic hash of the state-at-changeset structure and the section-state-at-changeset structure, writing to a local transactional database a changeset fat twin record communicating a changeset reference notification for each fat twin record to the parties, performing a certified operation in a blockchain a certified thin twin smart contract and passing the changeset reference, the cryptographically hashed state-at-changeset structure and the cryptographically hashed section-state-at-changeset structure, validating that a previous certified operation with the same changeset reference does not exist, writing to the blockchain a new thin twin record and performing a proof-of-certified-operation on the thin twin smart contract.

29 Claims, 26 Drawing Sheets

C-Send Execution

C-Send Audit

Certification Proof of C-Send

C-Forward Execution

Certification Proof of C-Forward

C-Update/C-Respond Execution

Certification Proof of C-Respond/C-Update

C-Instatiate Execution

Certification Proof of C-Instantiate

C-Copy/C-TrueCopy Execution

Certification Proof of C-Copy/C-TrueCopy

C-Response-Validate

SYSTEM AND COMPUTER PROGRAM PRODUCT FOR CERTIFIED CONFIDENTIAL DATA COLLABORATION USING BLOCKCHAINS

BACKGROUND OF THE INVENTION

Field of the Invention

The present invention is generally related to certified confidential data collaboration using blockchains.

Discussion of the Background

The bulk of communication, commerce and collaboration requires confidentiality. Confidential collaboration today is plagued by massive inefficiencies, lack of visibility, plausible deniability, data fragmentation, inconsistent data and the like. For example, consider a doctor writing a prescription. The doctor is the source-of-truth for the prescription which is considered confidential. In the prior art, there are two ways this is done. The doctor could write a prescription and physically hand it to the patient. The patient might take the prescription to a pharmacy. The pharmacy might accept the prescription based written on a certain type of paper or might verify the prescription by calling the doctor to confirm that the doctor had written the prescription. Alternatively, the doctor might ask the patient which pharmacy they wish to utilize. The doctor could then relay the prescription to the pharmacy via without limitation a fax machine. The patient could then go to the pharmacy to pick up the prescription once it is filled. However, the prescription could easily have been lost, with the doctor claiming it was sent and the pharmacy claiming it was never received. The prescription could also be an incorrect, with the prescription containing incorrect dosage, duration or the like. As this example illustrates, there exists inefficiencies and specialized scheme requirements in the prior art for such a collaboration to function. The introduction of errors, confusion, plausible deniability and the like are possible.

A key element of this type of collaboration is that it is confidential and involves more than two parties. As detailed above, simple confidential three-party scenarios involving confidential collaboration are fraught with numerous problems. With the introduction of additional parties, the possibility of confusion, plausible deniability, back-and-forth and the duration necessitated by the collaboration, increases exponentially. For example, assume that the pharmacy calls an insurance company for authorization of the prescription and that the insurance company declines to authorize the prescription for some reason. The pharmacy might then inform the patient of the non-authorization of the prescription by the insurance company. The patient may be required to call the doctor to amend the prescription in some way and the doctor might amend the prescription based on this new information, starting the whole process again. Importantly, in this example, there may be inaccuracies in the relayed information from the pharmacy to the patient and from the patient to the doctor. The introduction of an additional party, the insurance company, increases the possibility of confusion, plausible deniability, back-and-forth, and the duration necessitated by the collaboration. The duration necessitated by the collaboration can easily take weeks to conclude.

Blockchains are known in the prior art which may be used to collaborate in situations where the collaboration is not confidential, such as with some simple Smart Contracts. These types of non-confidential collaborations are also referred to herein as transparent collaborations. Unfortunately, blockchains known in the prior art cannot be used as the sole mechanism for confidential communication and collaboration without some significant compromises.

There are several impediments to using blockchains as the sole mechanism for confidential communication and collaboration today. These include without limitation, scale issues relating to the message size, scale issues relating to the transaction rate, confidentiality issues, orphaned block issues, and the like.

The size of the content of a message can easily be tens to hundreds of megabytes. Most blockchains known in the prior art have transaction sizes in the kilobytes, which is three orders of magnitude too small. For example, the average Ethereum transaction size as of November 2017 is less than 1 KB.

Blockchains known in the prior art can scale to tens of transactions per second, which is entirely too low a transaction rate. While there are proposals to scale blockchain transaction rates using approaches like Lightning Networks (Bitcoin) and Raiden (Ethereum), these approaches only scale highly specific payment transaction rates. Approaches to general transaction scalability like Ethereum Plasma are still in the research stage at this time.

Blockchains known in the prior art lack confidentiality and are inherently transparent. Approaches to add confidentiality to blockchains include zero-knowledge proofs, secure hardware enclaves and partitioning-as-a-means-of-confidentiality. Zero-knowledge proofs are not fully ready as a general-purpose solution for confidentiality. There are significant limitations in the types of operations they can handle. Secure hardware enclave approaches like Microsoft CoCo are still in the research phase. Partitioning-based confidentiality approaches like hyperledger fabric channels are limiting. For example, there is no partition that can encompass a dynamic-chain-of-trust. By definition, a dynamic-chain-of-trust forms a graph structure across potentially millions of users that cannot be partitioned.

There also exist orphaned block issues in the prior art. Parties cannot be sure that that a block will not eventually be orphaned at the time a block is added to the blockchain. For example, assume that a message is sent from $party_1$ to $party_2$ and captured in $block_N$. Later, $party_2$ forwards that message to $party_3$ and that transaction is then captured on $block_{N+1}$. It is possible that $block_N$ and $block_{N+1}$ will eventually get orphaned. This effectively causes a cascading series of rollbacks. However, the parties may have already taken off-chain actions corresponding to the two transactions that cannot be undone. For example, assume that a doctor C-sends a prescription to a patient who then C-forwards it to the pharmacy. If these two transactions end up on orphaned blocks, they can be interpreted as them being rolled back. However, the prescription may have already been filled. For blockchains like Bitcoin this is usually overcome by waiting for some number of confirmations before the probability of rollback becomes negligible. This approach makes dependent transactions fraught with problems.

Referring to FIG. 1B, a chart illustrating illustrating that in the prior art, the complexity of an exemplary collaboration increases as the number of collaborating parties increases, is shown. Graph element 54 represents the number of parties involved in the collaboration, which as shown ranges from 2 to 4 parties. Graph element 52 represents the complexity of the collaboration, including without limitation, the degree potential confusion, plausible deniability, time and back-and-forth necessitated by the collaboration, and the like. As shown, in general, as the number of parties in a confidential collaboration increases, the degree potential confusion, plausible deniability, time and back-and-forth as represented by line 56 rises exponentially.

Postal certified mail is known in the prior art. The venerable postal certified mail has long been a staple of certified commerce. However, there are several major problems associated with postal certified mail. The biggest problem is that postal certified mail knows nothing about the content, but rather only its container, the envelope. Postal certified mail is also slow and non-digital, making it very hard and inefficient to integrate into today's digital world.

Email is also known in the prior art. Email is one of the most successful general communication and collaboration tools in existence and is used extensively by businesses. However, email has many deiniciencies with respect to collaboration. Specifically, email does not support an agreed-upon single version of the truth, the content can be tampered with, the identity can be tampered with, time-stamps can be tampered with, it is repudiable, and is generally not truly confidential. Despite its deficiencies, there are no viable general purpose alternatives in the prior art for communication and collaboration. Because email includes the above deficiencies, there is a substantial human element involved in the interpreting, discovering, compensating and litigating, to allow certification characteristics to be partially extracted.

File Sharing is known in the prior art and used for collaboration. However, file sharing content can be tampered with and changes are repudiable. File Sharing is not a suitable candidate for certified communication and collaboration.

Notaries are known in the prior art. However, notaries do not enable communication and collaboration directly, but instead provide useful building block services such as various forms of attestation.

Biased collaboration systems are known in the prior art. In this context, the term biased refers to the characteristic that one of the parties to the communication and collaboration is considered an authoritative party. The greater the size asymmetry between the parties, the more likely it is for this model to be employed. For example, in business-to-consumer ("B2C") scenarios, the "B" side will often represent the system of truth. This means that weaker parties often have no choice but to rely on whims of the stronger party. For example, an ecommerce provider may claim that a consumer never placed an order and the consumer has no choice to accept this or get into some sort of customer service escalation with uncertain outcomes. Biased collaboration systems become even more problematic when the size disparity between parties is not so dramatic, such as business-to-business ("B2B") scenarios. This often results in a system where each party has its own biased system. Now the question becomes, whose reality is definitive. In a two-party relationship, the parties could in theory agree that a particular party's reality is authoritative. For multi-party collaborations, even this becomes impossible to achieve. So, these systems tend to be artificially segmented into pairwise relationships, making even the simplest multi-party collaborations highly complex.

Neutral, specialized collaboration systems are known in the prior art. Examples of these systems include without limitation Uber for ride sharing, eBay for auctioning, eSignature systems for document signing and the like. However, these systems are highly specialized systems for highly specialized use cases, require trust with a neutral party, and do not support dynamic chain-of-trust.

The present invention overcomes these and other limitations associated with certified confidential data collaboration.

SUMMARY OF THE INVENTION

Accordingly, one aspect of the present invention is to provide a method for providing certified confidential data collaboration between two or more of a plurality of parties where an established trust relationship is not required between the plurality of parties. The system includes creating, by a first party, a changeset proposal in the electronic transaction, communicating, by the first party, the changeset proposal to a semi-trusted governor party, creating, by the semi-trusted governor party, a thread tracking number, performing, by the semi-trusted governor party, a cryptographic hash of the thread tracking number to create a cryptographically hashed thread tracking number, validating, by the semi-trusted governor party, the changeset proposal and creating, by the governor party, a state at changeset structure containing one or more writers, performing, by the semi-trusted governor party, a cryptographic hash of the changeset proposal to create a cryptographically hashed changeset proposal, extracting, by the semi-trusted governor party, a section state at changeset from the changeset proposal, performing, by the semi-trusted governor party, a cryptographic hash of the extracted section state at changeset to create a cryptographically hashed section state at changeset, writing, by the semi-trusted governor party, to a local transactional database a fat twin record including the thread tracking number, the extracted section state at changeset and the state at changeset structure, for each fat twin record, communicating, by the semi-trusted governor party, a changeset reference notification in the electronic transaction each of the one or more writers, writing, by the semi-trusted governor party, a thin twin record in a thin twin smart contract including the cryptographically hashed thread tracking number, a changeset number, the cryptographically hashed changeset proposal, the cryptographically hashed state at changeset, and the cryptographically hashed section state at changeset the extracted section state at changeset, the cryptographically hashed state at changeset, and communicating, by the semi-trusted governor party, a record including the cryptographically hashed thread tracking number, the changeset number, the changeset proposal, the state at changeset, and the cryptographically hashed changeset proposal to a second party.

Another aspect of the present invention is to provide a method for providing certified confidential data collaboration between two or more of a plurality of parties where an established trust relationship is not required between the plurality of parties. The method includes (i) forwarding, by a first party and mediated by a semi-trusted governor party, a first contiguous range of changesets from a first certified thread, (ii) creating a second certified thread based on the first certified thread, (iii) writing, by the semi-trusted governor party, public cryptographically hashed information relating to first certified thread and public information including a cryptographically hashed thread tracking number, a changeset number and associated cryptographically hashed content relating to second certified thread to a blockchain. The first certified thread includes confidential information and public cryptographically hashed information. The second certified thread includes a second contiguous range of changesets derived from the first contiguous range of changesets. The second certified thread contains an untampered duplicate of the first contiguous range of changesets which can be verified by each of the respective plurality of parties of the second certified thread regardless of whether each of the plurality of parties respectively have access to the first certified thread but do have access to the respective public cryptographically hashed information relating to first and second certified threads written to the blockchain. The forwarding of the first contiguous range of changesets from the first certified thread being verifiable even where the semi-trusted governor party has become non-cooperative, non-available or malicious subsequent to the execution of the forwarding of the first contiguous range of changesets from the first certified thread.

BRIEF DESCRIPTION OF THE DRAWINGS

A more complete appreciation of the present invention and many of the attendant advantages thereof will be readily obtained as the same becomes better understood by reference to the following detailed description when considered in conjunction with the accompanying drawings, wherein.

DETAILED DESCRIPTION OF THE PREFERRED EMBODIMENTS

Figures 1A, 1B:
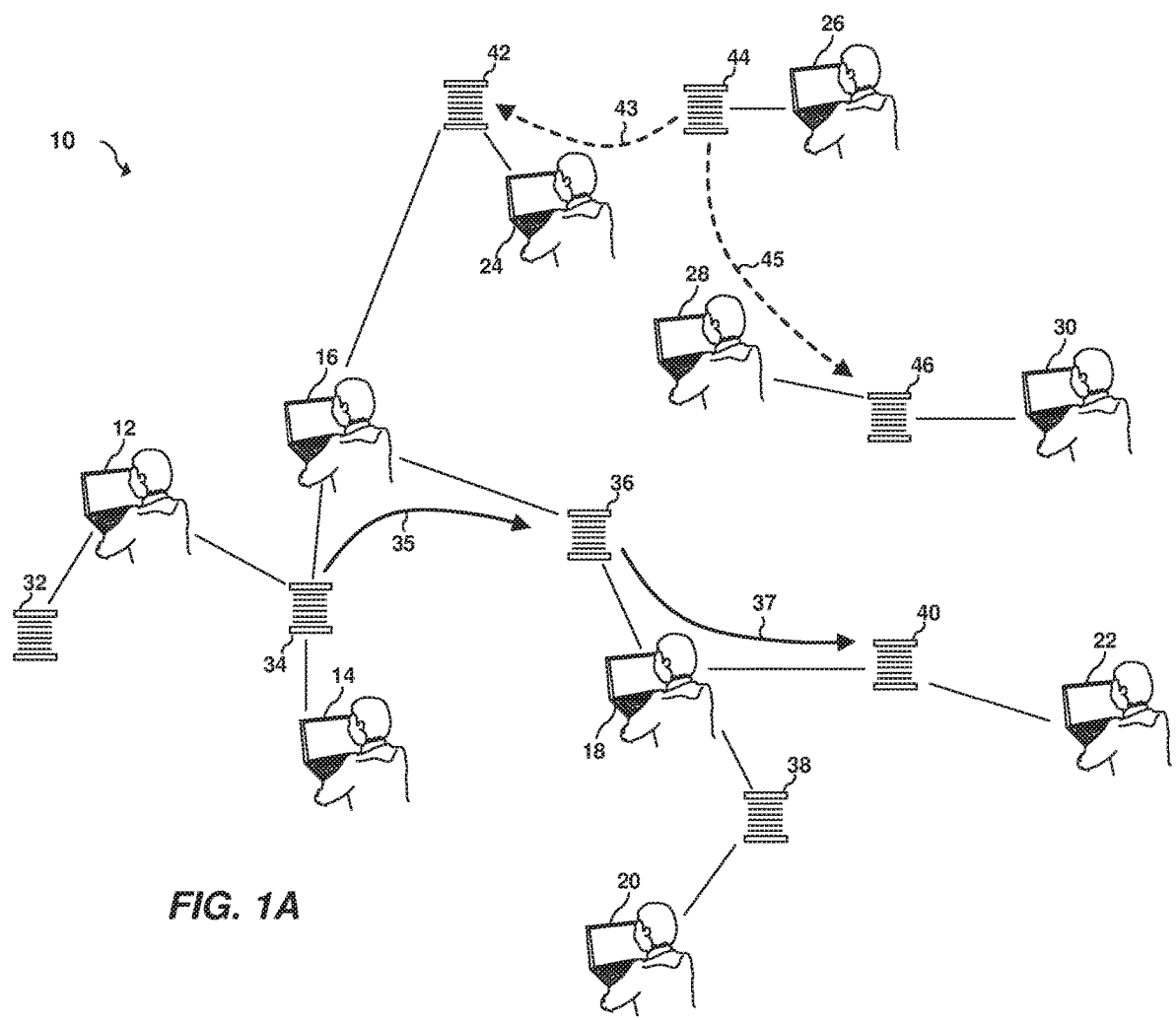
FIG. 1A is a block diagram illustrating an exemplary collaboration involving multiple parties.
FIG. 1B is a chart illustrating illustrating that in the prior art, the complexity of an exemplary collaboration increases as the number of collaborating parties increases.

Referring now to the drawings, wherein like reference numerals designate identical or corresponding parts throughout the several views, preferred embodiments of the present invention are described.

The present invention solves the deficiencies of the prior art by providing without limitation confidential certified communication and dynamic chain-of-trust. Dynamic chain-of-trust allows a party, such as a patient, to forward a certified communication, such as a prescription, to another party, such as a pharmacy, in such a manner that the second party can trust the provenance and content of the forwarded communication without having direct access to the original communication. A dynamic chain-of-trust is also confidential. The present invention utilizes various confidential certified communication and collaboration operations including without limitation, C-sends, C-forwards, C-update, C-drop, C-drop-updates, C-TrueCopy, and C-instantiation as defined herein. "C-send" refers to a certified communication and "C-forward" refers to a certified forward.

Table 1 below illustrates the differences between transparent collaboration and confidential collaboration. Differences between the present invention and the prior art are further distinguished for confidential collaboration.

TABLE 1

| | Transparent Collaboration | Confidential Collaboration | |
| --- | --- | --- | --- |
| | | Prior Art | Present Invention |
| Supported by blockchains | Yes | No | Yes |
| Data Consistency | Single Version of the Truth | Fragmented and Inconsistent | Massive decrease in fragmentation and inconsistency |
| Plausible Deniability | None | Extremely High | None |
| Access to Data to make Decisions | All data is accessible | Lack of access to relevant data makes transacting hard | Significantly improved accessibility |
| Decentralized | Yes | No (Every party that is the trusted source for a piece of confidential information is a point of centralization, referred to herein as "Secondary Centralization") | Massive reduction in secondary centralization |
| chain-of-trust | Yes (Implicit) | No | Yes |

To illustrate how the present invention's use of a confidential dynamic chain-of-trust massively improves certified confidential data collaboration between multiple parties, consider a non-limiting health industry example. Assume that a patient that has insurance visits a physician for a health issue. The physician orders lab results, makes a diagnosis, gives the patient a prescription and refers the patient to a specialist. The parties involved in this non-limiting example include a patient, a physician, a specialist physician, a lab, a pharmacy, a physician credentialing board, an insurance company, the Department of Public Safety (for the driver's license of the patient), and a notary.

For the first example, assume that the Department of Public Safety C-sends a driver's license to the patient's address on file. The patient C-forwards the driver's license to a notary. The notary attests that a given real-world identity (as proved by the Driver's license sent from a digital address) maps to a particular digital address and C-sends this attestation back to the patient. Under this scenario, there exists a dynamic chain of trust between the Department of Public Safety and the patient, and between the patient and the notary.

Assume that the patient sets up an account with a pharmacy. The patient C-forwards the notary's attestation to the pharmacy. Now, there exists a dynamic chain of trust between the notary and the patient, and between the patient and the pharmacy.

Assume that the physician credentialing board C-sends the physician credentials to the physician. The physician could go through a similar notary process as the patient did to associate their digital identity with their real-world identity.

Assume that the physician creates an account with a pharmacy. The physician C-forwards the physician credentials to the pharmacy. Under this scenario, there exists a dynamic chain of trust between the physician credentialing board and the physician, and between the physician and the pharmacy.

Assume that the physician C-forwards the notary's attestation to the pharmacy. Here, there exists a dynamic chain of trust between the notary and the physician, and between the physician and the pharmacy.

Assume that the insurance company C-sends the insurance card to the patient. The patient C-forwards the insurance card to the physician. Under this scenario, there exists a dynamic chain of trust between the insurance company and the patient, and between the patient and the physician.

Assume that the physician C-sends a lab work order to a lab. The lab C-sends the lab work results to the physician referencing the lab work order. The physician C-forwards the lab work results to the patient. Here, there exists a dynamic chain of trust between the lab and the physician, and between the physician and the patient.

Assume that the physician C-sends a referral for a specialist physician to the patient. The patient C-forwards the referral to the insurance company for authorization. There exists a dynamic chain of trust between the physician and the patient, and between the patient and the insurance company. The insurance company C-sends the approval to the patient. The patient C-forwards the approval to the specialist. There exists a dynamic chain of trust between the insurance company and the patient, and between the patient and the specialist. The patient C-forwards the referral to the specialist. There exists a dynamic chain of trust between the physician and the patient, and between the patient and the specialist. The patient C-forwards the proof of insurance to the specialist. There exists a dynamic chain of trust between the insurance company and the patient, and between the patient and the specialist. The patient C-sends the lab work to the specialist. There exists a dynamic chain of trust between the lab and the physician, and between the physician and the patient, and between the patient and the specialist. The patient C-sends an authorized request for appropriate medical records from the physician. The physician C-sends the records to the patient. The patient C-forwards the medical records to the specialist. There exists a dynamic chain of trust between the physician and the patient, and between the patient and the specialist.

Assume that the physician C-sends the prescription to the patient. The patient C-forwards it to the pharmacy. Under this scenario, there exists a dynamic chain of trust between the physician and the patient, and between the patient and the pharmacy.

In the prior art, at every single point where a chain-of-trust is involved, a party must either confirm with a certifying source or trust the relaying party (referred to herein as a static chain-of-trust). The former often involves multiple communications introducing substantial delays into the process and introduces a plausible deniability for all parties which leads to substantial uncertainty, rechecking, re-verifying and the like. Finally, each party assembles their own potentially contradictory facts leading to massive confusion and finger-pointing. Parties that don't like a particular outcome might utilize plausible deniability to delay and obfuscate. The latter, also leads to a situation of plausible deniability and every party having to trust every relaying party. This widespread need for trust in every relaying party is a significant impediment to commerce.

A static chain-of-trust is known in the prior art and has been used in public key cryptography systems like PGP. As used herein, the chain-of-trust is referred to as static because it is based on the creation of static trust relationships. For example, if person A trusts person B and person B trusts person C, then person A can trust person C. However, there are problems associated with static chains of trust as applied to a confidential collaboration. The trust relationship needs to be created up front. This severely limits the applicability of this technique to widespread commerce. The trust relationship is not contextual. It is assumed to exist for all types of information. This makes it impractical to use except under very specialized conditions. For example, consider a doctor→patient→pharmacy chain. A pharmacy cannot trust every patient it encounters to forward a prescription from a doctor to the pharmacy without tampering. Because of this, pharmacies typically verify the prescription by calling the doctor back. Where prescriptions are written on a special prescription pad, the pharmacy has to verify that this is not a forgery if they don't verify the prescription by calling the doctor back. While this might not be a high risk for some prescriptions, it might be a high risk for other prescriptions involving highly controlled prescriptions such as DEA Schedule II Drugs, which include opiates and narcotics.

A dynamic chain-of-trust is based on not requiring up-front trust in any of the relaying intermediaries. In blockchain terminology, the chain is made up of trustless intermediaries, where "trustless" means that trust is not required rather than the parties being necessarily untrustworthy. As used herein, the chain-of-trust is referred to as dynamic because a confidential trust chain is dynamically created on top of trustless intermediaries.

According to at least one embodiment, the present invention utilizes certified communication and collaboration, which as used herein means a communication or collaboration where certain minimal core criteria are met in the communication and collaboration between parties, including without limitation: (1) there is an agreed-upon single version of the truth; (2) content cannot be tampered with; (3) the identity cannot be tampered with; (4) timestamps cannot be tampered with; (5) communications or changes to the state are non-repudiable; (6) communications and state are confidential; (7) the system is not biased in favor of any party; and (8) the system is general purpose.

Traditional certified mail sent via the postal system only certifies that a certain party sends another party something at a particular time. The biggest problem with certified mail is that the content is not certified. According to at least one non-limiting embodiment, the present invention utilizes certified messaging, also referred to herein as "C-send". Certified messaging provides certifies the parties, the time and the content. Certified messaging is also generally configured as a multi-party communication, which includes the possibility of a two-party communication. Either all of the parties receive the communication or none of the parties receive the communication. Such an arrangement opens up a vast number of new use-cases. For example, a legal notice sent via certified messaging certifies, the parties, the time and the actual content of the contract and that content is non-repudiable. This dramatically increases the value of certification. Some uses of certified messaging are sending legal notifications, business transaction communications, form submissions, statement notifications and the like.

An example of a multi-party C-send might be a vendor sending an advance ship notice to both a buyer and a carrier as both need this information.

The present invention includes the concept of certified forwards or C-forwards. Certified forwards enable certified communications that were received to be forwarded to others in such a way that the final receiving party can (cryptographically) trust that the original communication was forwarded without tampering. Importantly, they do not need to trust the relaying party to be able to detect tampering. Certified forwards can be cryptographically trusted with respect to timestamp(s), identities and content of the certified communications/threads being forwarded, where content includes without limitation comments, attachments and state. Certified forwards enable a new breed of private interactions. Certified forwards also enable a dynamic transitive trust. If user1 C-sends a communication to user2 and user2 C-forwards it to user3 and user3 C-forwards it to user4 and the like, then user4 can trust that the entire forwarded chain is (cryptographically) trustworthy in terms of content, timing and identity, without having to trust any of the intermediaries.

C-forwards and dynamic transitive trust are transformative in the realm of confidential transactions. For public transactions, C-forwards are not needed and simple references (such as smart contract references) would suffice.

Blockchains provide decentralization and remove the need for trusted intermediaries. However, it is also well appreciated that the current state of the art does not work well for confidential transactions. Various approaches such as the Microsoft CoCo framework, Hyperledger channels and the like are now reaching the prototype stage to somewhat address this issue. While these new blockchain confidentiality features will allow hitherto off-chain private transactions to move on-chain this capability is not sufficient in and of itself to enable certified communication and collaboration capabilities like confidential dynamic chain of trust.

Confidential collaboration is often comprised of a web of interrelated transactions. If these transactions were public then the relationships would be easy to model and utilize. A simple link between public transactions would suffice. This is the situation with the public world-wide-web as well as public blockchains such as Bitcoin and smart contract platforms such as Ethereum. For confidential transactions, the web of trust of interrelated transactions is severed at the parties themselves. Therefore, even though the transactions themselves are stored in a decentralized manner, validating transactions requires trusting intermediate parties. This results in a trust that depends upon the parties which is a more acute form of trust. This is not just having to trust a single neutral third-party, but having to trust every relaying party in the confidential transaction graph.

Figure 1C:
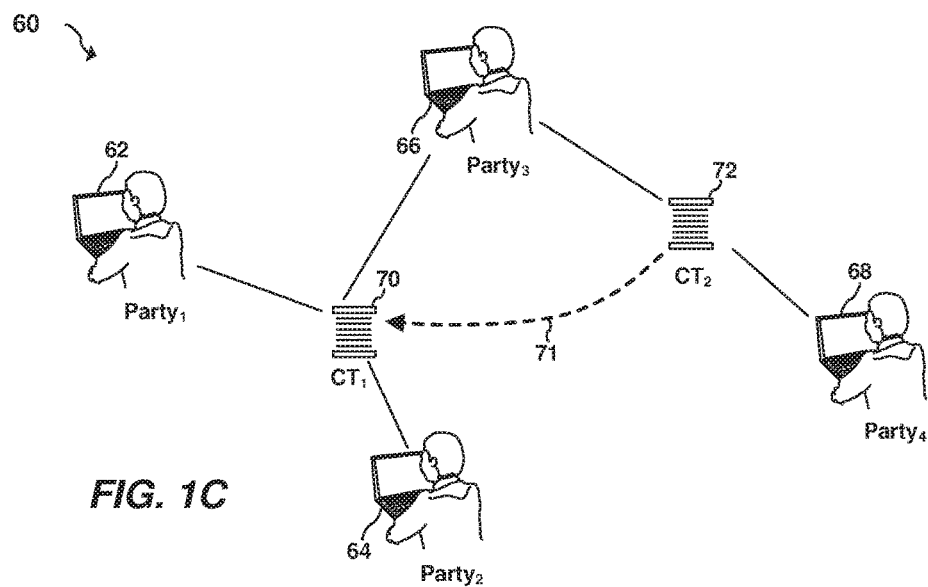
FIGS. 1C-1E are block diagrams illustrating various exemplary collaborations involving multiple parties.

FIG. 1C is a block diagram illustrating an exemplary transaction 60 involving multiple parties. Assume this a confidential transaction involving certified thread $CT_1$ 70 between party$_1$ 62, party$_2$ 66, and party$_3$ 68, and certified thread $CT_2$ 72 between party$_3$ 66 and party$_4$ 68, where certified thread 72 has a validation dependency 71 on certified thread 70. Such interdependencies are fairly common in confidential transactions. In this example, party$_3$ 68, does not have access to certified thread $CT_1$ 70 and therefore cannot validate certified thread $CT_1$ 70. Because of this, party$_3$ 68 cannot validate certified thread $CT_2$ 72. An example of a validation dependency is where $CT_2$ is asserted to be a forward of all or a subset of $CT_1$.

In a public transaction, by contrast, party$_4$ 68 would have access to certified thread $CT_1$ 70 and would therefore be able to validate certified thread $CT_2$ 72. Party$_2$ 66 may now forward certified thread $CT_1$ 70 to party$_4$ 68. However, in a confidential transaction, this requires party$_4$ 68 to trust party$_2$ 66 regarding the transaction and party$_4$ 68 has no independent way of verifying the transaction. This is how a severe form of trust recentralization occurs, even if utilizing a decentralized technology like a blockchain.

Certified forwards and dynamic transitive trust are the mechanism used by the present invention to remove this trust recentralization of confidential transactions, which is referred to herein as "secondary decentralization" where primary decentralization being the trust decentralization of public transactions which is provided natively by blockchains.

Figure 1D:
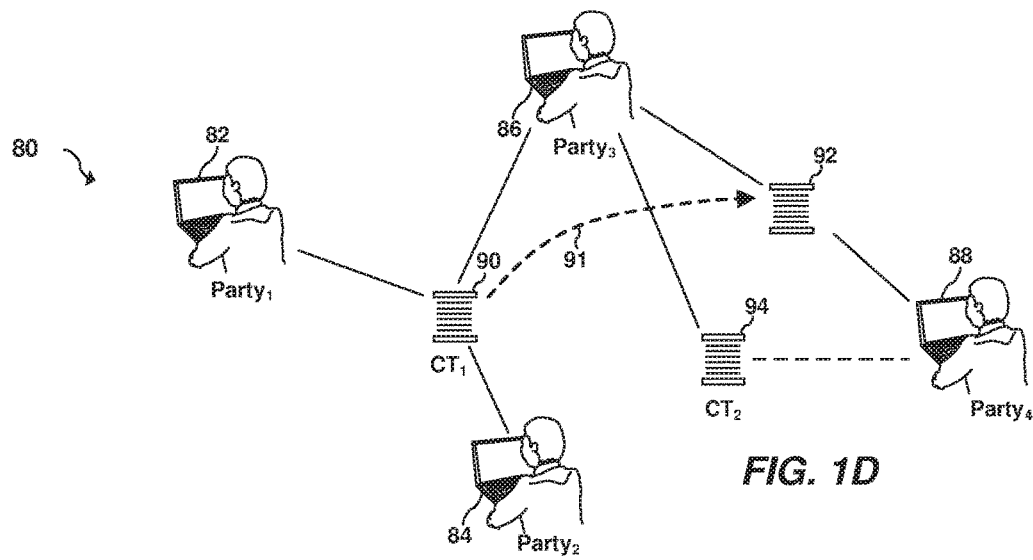

FIG. 1D is a block diagram illustrating an exemplary transaction 80 involving multiple parties using certified forwards (also referred to herein as "C-forwards") enabled secondary decentralization. Assume that party$_3$ 86 C-forwards certified thread $CT_1$ 90 to party$_4$ 88 as represented by line 71. Such an arrangement facilitates validation of certified thread $CT_2$ 94, which party$_4$ 88 does not have access to, by means of the C-forward 92 of certified thread $CT_1$ 92, which party$_4$ 88 does have access to, because a transitive trust is cryptographically ensured. Therefore, party$_4$ 88 no longer needs to trust party$_3$ 86 relative to certified thread $CT_1$ as the transitive trust is cryptographically ensured. Transitive trust allows parties to follow a dynamic chain of trust back to an originating transaction without requiring trust in any of the intermediate parties. In addition to secondary decentralization, transitive trust will vastly reduce the complexity and confusion of the confidential transaction.

Figure 1E:
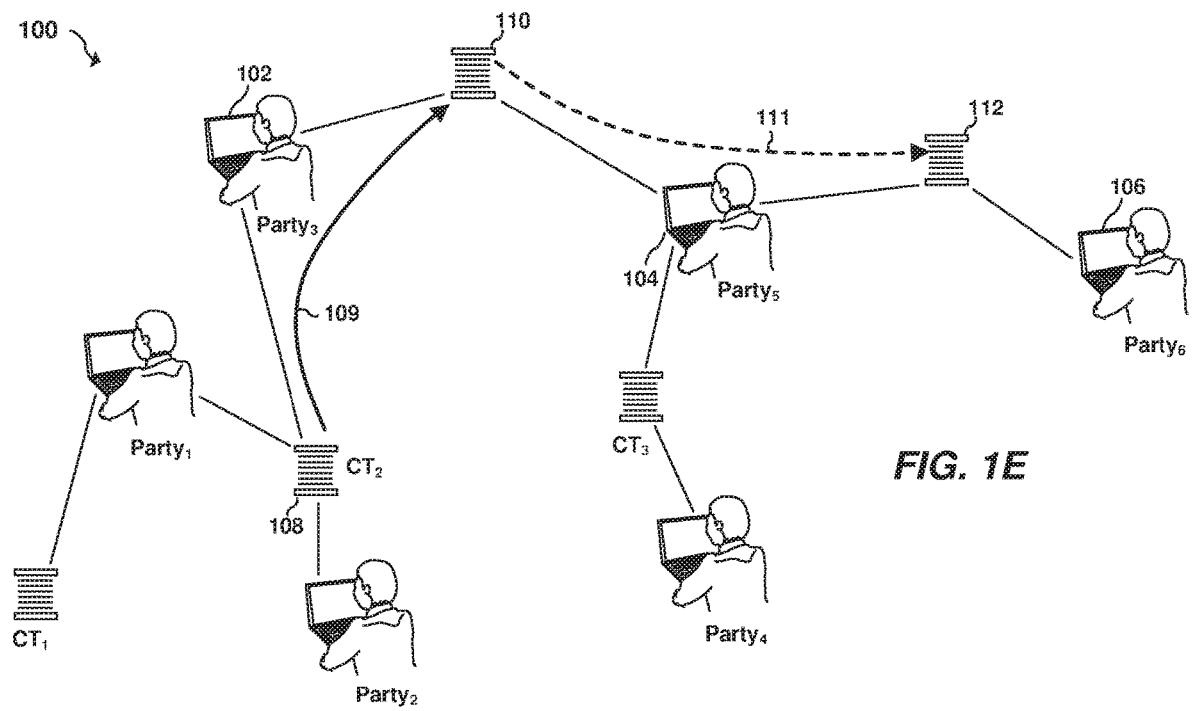

FIG. 1E is a block diagram illustrating an exemplary transaction 100 involving multiple parties using certified forwards showing how transitive trust can be indefinitely chained. Assume that party$_3$ 102 C-forwards certified thread $CT_2$ 108 to party$_5$ 104 as represented by line 109. Party$_5$ 104 then C-forwarded 110 certified thread (originally $CT_2$ 108) to party$_6$ 106 as represented by line 111. This could continue indefinitely. For the same reasons as previously detailed, no party no longer need to trust another party in this chain because there exists a transitive trust between each of them in the chain.

In one non-limiting embodiment, a certified thread is only partially C-forwarded. For example, if a certified thread has 12 changesets numbered 1-12, only changesets 7-12 may be C-forwarded. The recipient would be able to trust the content of changesets 7-12 and would also know that changesets 1-6 were not forwarded. Partial C-forwarding can be even more fine-grained.

The present invention goes beyond certified messaging to represent certified state and allows that state to be updated in a certified manner. These updates are also referred to as changesets. This allows certified threads to represent things that evolve over time, such as without limitation versioned entities. Not only is the creation of the entity (in the certified thread) certified, but the changes to it (changesets) are also certified. According to one non-limiting embodiment of the present invention, the primary entity is a versioned thread rather than a communication to facilitate this. A communication is merely a special case of thread with one changeset. For example, a buyer may send a seller an order via certified messaging. However, orders are often changeable after they are created, via for instance change orders. Rather than a C-send of a separate change order, the user can update the initial order certified thread which creates a new version of the order. This has the benefit of their being a certified latest state of the certified thread.

According to one non-limiting embodiment of the present invention, certified threads are immutable and append-only. This means that the original version of the order is version #1 and the new version of the order is version #2. Such an arrangement provides the relevant parties involved a full history of the versioned entity, such as an order, as well as its current latest state. This eliminates the possibility of ambiguity on the current latest state. Another example would be a finance company sending statement updates via a single certified thread. The recipient will have the entire history of account statements as well as can see the certified up-to-date account state, such as the current balance, at a glance. Certified threads may also be used to certifiably collaborate on any versioned entity, including without limitation orders, wills, application forms, prescription refills, insurance claims, and the like. The state history is certified in that no party can repudiate any element of the entire state history in terms of content, timing, and identity.

Certified communications are a special case of a certified thread. They are basically a certified thread with only a single (first) changeset. C-forwards also work with certified threads with multiple changesets. Instead of just C-forwarding a communication (changeset #1), a user can C-forward an entire certified thread at a particular changeset. This C-forwards the entire non-repudiable history until that changeset. Any subsequent changes are not C-forwarded. The act of adding a certified changeset is also called C-updating. As used herein C-sending and C-forwarding is associated with communication and C-updating is associated with collaboration.

The present invention may be used for certified forms. Parties can fill in forms and C-send the resulting filled-in form. Parties can collaborate (C-update) on forms as well. Both the structure of the form and the filled-in values are certified and cannot be tampered with. Parties can create smart templates (see below) with forms or create forms on the fly. The present invention may be used with any type of certified form including without limitation school application forms, insurance claim forms, order forms, event registration forms, membership forms and the like. Certified form smart templates may be made instantiable by everyone or only instantiable by organization users. Certified forms may be C-forwarded once completed. Forms include without limitation native forms, Adobe PDF forms and the like. These forms may be added to smart templates as detailed below. The forms are certified both in terms of structure as well as in terms of value. Neither the forms structure nor the entire state history of the form can be repudiated in terms of content, timing and identity.

When a certified communication is sent to another party, that party can respond with a non-repudiable certified read acknowledgement. A certified read acknowledgement, also referred to herein as a "C-ReadAck", is a special kind of changeset in which a party to the certified thread certifies that they have read the communication (or a particular changeset). More generally, because certified threads can have multiple changesets, the certified read acknowledgement is generalized to a user confirming they have read until a certain changeset. For example, a buyer and a seller may be negotiating a contract. This negotiation may span over multiple changesets. For instance, assuming there have been 15 changesets in a two-party negotiation, if both parties acknowledge that they have read up to changeset #15, then this acknowledgement would be reflected in changesets #16 and #17, respectively. Certified ReadAcks are non-repudiable and cannot be denied by any party in terms of timing, identity and the part of the thread that has been asserted to have been read.

Certified true copies, also referred to herein as a "C-True-Copy", creates a certified thread which is a certified true copy of the current state, but not the history, of another certified thread. Certified true copies bear a superficial resemblance certified forwards. They differ in that the original timestamp is not considered part of the certified true copy. Additionally, they do not propagate identity or copy the history, and certified true copies do not possess the transitive property of C-forwards. Certified true copies are useful when a party wishes to make proposed changes to the state of a thread and then other parties can know in a certified manner the true certified difference between the proposed changes and the state at which the certified true copy was made.

A certified drop or C-drop allows the user to create a certified thread that is not initially sent to anyone else. This essentially allows a user to later prove that the changeset existed at a point in time—a postponed proof of existence. At the time of the C-drop, no one else knows about the existence of this dropped changeset. This is distinct from a public proof of existence. An example of a use-case for certified drops would be a C-dropping a Will. A person would normally C-forward their Will to their executor. Upon that person's death, the executor could C-forward the Will to the Will beneficiaries, probate courts, trustees and the like. C-drops and deferred C-forwarding cannot be repudiated by any party.

A user can also do drop updates, referred to herein as "C-drop-updates", for versioned entities. In this case there is delayed proof-of-existence of the initial drop as well as for each subsequent drop update. In the Will example, by doing C-drop-updates, the current version of the will is always evident and certified. This is particularly important on the death of the user.

Another use-case of C-drops would be a patent certified thread. This way a user can record the idea when they get it and establish a certified priority date and related content, and later C-forward it to a patent attorney if needed. The original C-drop cannot be tampered with in terms of time, content or identity.

Certified threads can optionally be templatized into smart templates, which have some similarities with smart contracts. For instance, Ethereum smart contracts or Hyperledger smart contracts with some significant differences. Smart templates allow repeating patterns of certified threads to be codified into a reusable smart template. Smart templates are themselves certified threads and can be repeatedly instantiated to create smart template Instances. This process is called certified Instantiation or C-instantiation.

The differences between smart contracts and smart templates are shown in table 2 below.

TABLE 2

| | Smart Contract | Smart Template |
|---|---|---|
| Created By | Software Developers | business People |
| Code-style | Imperative Command-based | Declarative state-based, state-Change |
| validation | Deep | Shallow |
| Purpose | contract-as-code | Structured & Unstructured Communication and Collaboration |
| Philosophy | permissions-over-forgiveness | Forgiveness-over-permissions |
| contract Enforcement | In Code | Explicit state Markers |
| Mutability | Immutable | Immutable, Versioned |
| Interpreted by | Primarily code, secondarily people | Primarily people, secondarily code |
| Privacy (of smart contract/Template Instances) | Public | confidential |
| Parties | On-chain | On-chain and off-chain |
| Anti-spam | Ether-gas disincentivizes spam (paid to miners) | antispam token awards (paid to parties on the certified thread) |
| Tokens | Ethers | CertCoins |
| addresses | Ethereum addresses | blockchain addresses, Ethereum addresses, Email addresses |
| smart contract/smart template address | Ethereum addresses | thread Tracking Number (e.g. 123-1244-2432) |
| Runs On | N/A (self) | Ethereum blockchain |
| Governed by | Miners | the present invention governors. Each certified thread is governed by a single (trusted) governor. |
| App Store | dApp Stores | governor Template Store |
| Instantiated into | smart contract instance | certified thread instance(s) |

As noted in the tale above, there many differences between smart contracts and smart templates. For instance, smart contracts are written in imperative code, such as Solidity in Ethereum, ChainCode in Hyperledger and the like, whereas smart templates are written in a declarative form, which are designed using visual designers which generate the declarative form.

Imperative code is an important aspect of smart contracts. Being written with code means that smart contracts can encapsulate a great deal of highly sophisticated and specific behavior. One downside of smart contracts is that they become exponentially harder to debug as they get more complex. Also, by definition, they need to be written by software developers.

A smart contract is code-as-contract and removes people from the execution and interpretation of the contract. A smart template is a templatized certified communication and collaboration between parties. Whether a particular smart template should be considered a contract is something that is left to the parties to decide. A good analogy would be, if an individual were to send an update to their will to their attorney via certified mail, does that constitute a contract between the individual and the attorney? It may or may not. Smart templates are silent on whether the synchronized state between parties constitute a legal agreement between the parties. Smart templates are designed to be created by business people rather than software developers and can typically be created in a few minutes and published to template stores.

Smart contracts are based on consensus and require global visibility, or in the case of permissioned blockchains, at least community-wide visibility. This allows anyone to validate the code and achieve consensus. However, there is global, or at least community-wide, visibility of the instance. For very simple smart contracts like sending virtual currency this problem may be overcome through zero knowledge proofs. However, there is no (currently practical) possibility of overcoming this problem for general smart contracts without severe compromises.

Smart templates are based on a confidential visibility model. Only the parties to the smart template instance have visibility to the certified thread. For example, if a patient, pharmacy and a doctor are the only three parties on a prescription instance, they will be the only three parties who can see this certified thread instance. This visibility model is considered to be absolutely critical to the vast majority of use-cases of the present invention. When a certified template is C-instantiated to create a certified instance of that template, the relationship between the instance and the template is non-repudiable. In other words, an instance cannot be tampered with relative to its template before it is sent.

Figure 1F:
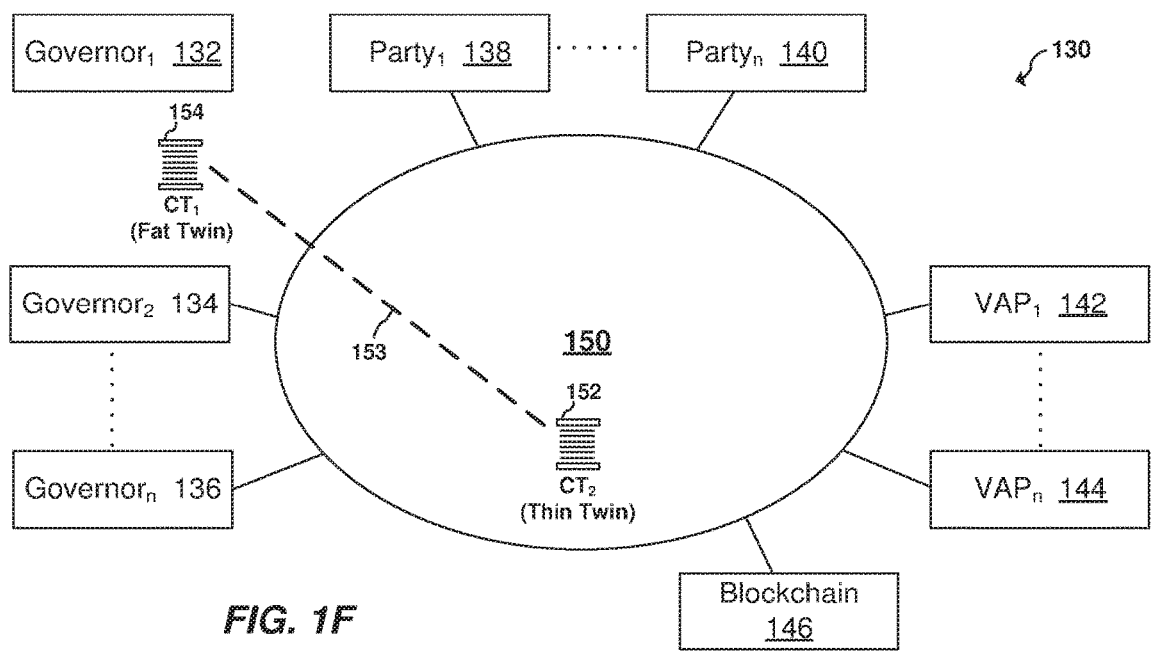
FIGS. 1F-1G are block diagrams illustrating an exemplary system for confidential data using blockchains in accordance with an embodiment of the present invention.
Figure 1G:
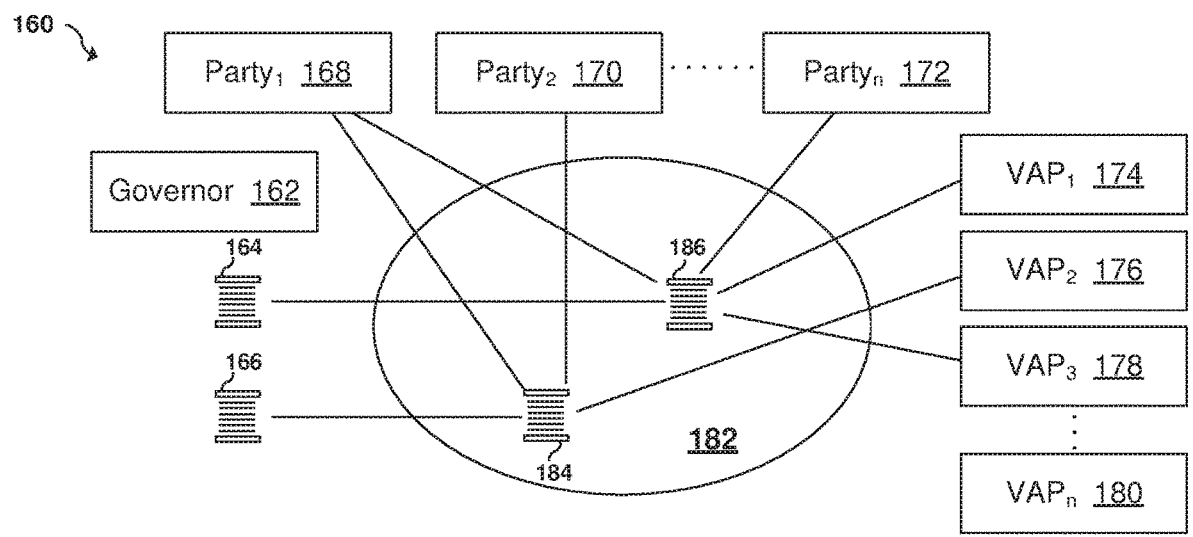

Referring to FIG. 1F, a block diagram illustrating various entities in the present invention, is shown. As shown, these entities include without limitation thread governors (132-136), parties (138-140) and value-added parties ("VAP") (142-144). Each entity may have multiple roles. For example, an entity may be a governor, a party, and/or VAP.

According to one non-limiting embodiment of the present invention, at least one governor (132-136) must exist for new C-transactions to be processed. Every certified thread is managed by a single governor. A governor is a trusted entity that provides without limitation confidential validation of C-transactions, confidential storage of certified thread fat twins, and synchronization of the off-chain fat twin 154 with the on-chain thin twin 152. A certified thread, which is discussed in further detail below, comprises without limitation an off-chain confidential fat twin, and an on-chain public thin twin. A transiently semi-trusted governor is utilized for confidential validations of C-transactions and therefore all C-transactions are routed via a governor. Standard parties, place temporary trust in the governor. Once the governor has synchronized the fat twin with the thin twin, its job is done. All the future cryptographic proofs can be done without the consent, authorization or even existence of the governor. The inability to perform confidential validations is a key limitation of blockchains known in the prior art. Blockchains known in the prior art are unable to scale to the sizes of the confidential fat twin. Confidential fat twins could easily be tens of megabytes in size, whereas the average Ethereum transaction size was less than 1 kilobyte. That is a four to five order of magnitude difference.

The standard parties are the parties transacting certified, confidential business utilizing certified threads, for example a buyer and seller on an order certified thread. The present invention includes a variety of value added parties. These VAP roles are not mutually exclusive.

According to one non-limiting embodiment, the system includes an auditor VAP. The purpose of the auditor VAP is to audit the validation and certified thread construction performed by the governor. This is an optional safeguard against a malicious governor. Alternatively, standard parties themselves can audit any transaction, but it may be more convenient to rely on an auditor VAP. C-transactions are initially executed by a governor. The auditor VAP independently re-executes the transaction asynchronously. Auditor VAPs get a changeset proposal as well as a fat twin and optionally a parent fat twin(s) state from the governor. The fat twin and parent fat twin(s) are independently validated against a changeset proposal and proved against their corresponding thin twins.

According to one non-limiting embodiment, hashed ChangesetProposals are written to a ChangesetProposal thin twin. This eliminates any ability of a governor to tamper with a transaction without detection.

According to the present invention, a C-transaction may be proved or certified using open-source code. In addition, an arbitrator VAP is provided as a convenience for proving C-transactions. An arbitrator VAP can be used to prove whether a particular C-transaction occurred, even without any assistance from a governor and even if a governor is no longer operating. This is because proofs can be done directly against blockchain thin twins. The fat twins need to be provided to an arbitrator. One mechanism is to provide the fat twin in the form of a fat twin zip file.

Witnesses are value added partners that participate in a certified thread and act as witnesses to the certified thread. They are neutral third parties that can prove that a particular certified thread was created or changeset occurred. Parties can also prove that a certified thread was created or that a changeset happened. But this might be more convenient to rely on a witness. If the governor of a certified thread is an implicit witness, then utilizing a third-party witness WAP is a mechanism to reduce reliance on the governor. A witness may be engaged where the governor is an implicit witness, the witness is added as a party to the certified thread, and whereas certified thread is later C-forwarded to a witness. In general, witnesses provide a subset of the capabilities of an auditor.

The difference between a witness VAP and an arbitrator VAP is the mechanism by which they obtain a fat twin. A witness VAP is a standard party on a certified thread or has a certified thread C-forwarded to them, whereas an arbitrator VAP obtains the fat twin through out-of-bound mechanisms such as a fat twin zip file sent by a party that wishes a proof. An entity may be both a witness VAP and a prover VAP.

Backup VAPs are configured to act as a backup service. They can store certified threads (specifically the certified thread fat twin) for later retrieval. Note that parties themselves can act as their own backup service, but it may be more convenient to use a backup VAP. Backup VAPs may provide different levels of guarantees in terms of storage duration and retrieval SLAs. In addition, governors may also provide implicit backup services. However, backup VAPs can reduce reliance on a governor where employed.

The present invention uses the terms writer, commenter and reader. As used herein, the term writer is used to represent a transacting party. Or said another way, a writer is a party that can make changes to the certified thread. As used herein, the term reader is used to represent a party that cannot make any changes to the certified thread. Finally, as used herein, the term commenter is used to represent a party that is allowed to add comments (and attachments), but is otherwise not be allowed to make any other changes. Readers and commenters will not be able to add, modify or delete sections or add other writers, readers or commenters.

In every changeset, a sender can add zero or more writers. For example, assume that for changeset1 (CS1), $party_1$ sends to recipients $party_2$, $party_3$ and $party_4$, and designates $party_2$, $party_3$ and $party_4$ as writers (SAC1.writers=$party_2$, $party_3$, $party_4$). For changeset3, $party_1$ adds recipient $party_5$, and designates $party_5$ as a writer (SAC3.writers=$party_2$, $party_3$, $party_4$, $party_5$). For changeset5, $party_1$ adds recipients $party_6$ and $party_7$, and designates $party_6$ and $party_7$ as writers (SAC5.writers=$party_2$, $party_3$, $party_4$, $party_5$, $party_6$, $party_7$).

In one non-limiting embodiment, rather than a backup VAP, a governor writes the fat twin changeset, in for instance a ZIP file format, to a decentralized file system like FileCoin. The governor generates a unique key for each changeset referred to herein as a changeset encryption key (CEK). This CEK is retained by the governor as well as distributed to each transacting party at that changeset in the certified thread. The decentralized file system acts as a backup for the transacting parties so long as they retain their CEK. The exposure of a CEK only causes a single changeset to be exposed. Any form of proof which requires a fat twin changeset can also be performed with a fat twin CEK.

Smart template VAPs create smart templates that are available to any party or entity, which helps promote standardization. For example, instead of every party defining its own purchase order, they may use the purchase order previously defined by a particular smart template VAP. Because smart templates are a particular type of certified thread, smart template creation and updates (versioning) will be routed through a governor like any other changeset. Template stores are configured to list the available thread templates for smart template VAPs.

Smart template specialized VAPs are VAPs that are specialized based on a particular smart template. For example, consider a prescription smart template. A prescription buddy VAP might keep a user's location and preferences and decide which pharmacy to submit a prescription to based on availability, pricing and the like.

A common type of specialized VAP is a deep validator VAP. governors only do shallow validation. In the prescription example, the smart template may have a certified form that represents the prescription. Basic form validation like presence/absence of mandatory fields, simple type validations, etc. Fundamentally, the governor knows nothing about prescriptions. A deep validator that understands prescriptions could validate that a particular pharmaceutical name is valid.

Search VAPs store certified threads (specifically certified thread fat twins) and allow parties to perform searches over their certified threads. Different Search VAPs may provide different degrees of searching.

Notary VAPs validate the true identity of a party and record that into the certified thread. Note that true identity is considered content and hence will not be stored in the certified thread thin twin. Transacting parties can then use C-forwarding and a dynamic chain of trust to prove their identities to any other party.

How a party proves their true identity to the notary VAP is between the notary and themselves.

KYC or know your customer is a regulatory requirement placed on certain financial institutions to verify the identity of their customers. KYC VAPs can perform this verification and provide a certification which may be c-forwarded to other institutions by the customer utilizing the dynamic trust model.

According to one non-limiting embodiment, the present invention utilizes protocol tokens called, CertCoin tokens or CertCoins. The purpose of CertCoin tokens is to create a balance of incentives that facilitate a smooth functioning of the present invention. One of the major problems with current electronic communication systems such as email is the problem of spam. The present invention uses an economic disincentive to discourage spam by assessing a per-recipient cost (in CertCoins). Furthermore, the anti-spam fee is paid to the recipient. In effect, the transfer amount can be considered an attention reward on the recipient side and an anti-spam fee on the sender side. Governors may be paid in CertCoins for their services. Smart template creators may be paid in CertCoins at the time of smart template instantiation. Value added parties may be paid for their services in CertCoins.

According to one non-limiting embodiment, the present invention utilizes an underlying blockchain, which may include without limitation an Ethereum blockchain. The blockchain fees may be paid by the governor perhaps in the Ethereum currency (Ethers) and collected in CertCoins.

Numerous services may be priced in terms of basic certification units or BCUs rather than directly in CertCoins, due to the price volatility of tokens such as CertCoins.

As previously discussed, according to one non-limiting embodiment, certified threads are hybrid entities with the fat twin managed by a governor. Governors are responsible for managing these identities, subject to certain rules. Governors are registered using a graphical user interface associated with the present invention. When a governor is registered, a governor domain name is provided which is validated by the present invention. The default governor at launch is without limitation "tmail21.com". Certified thread identities are identified as follows:

<governorDomainName>://<unique-thread-tracking-nbr>.

For example, the following may be URL which include certified thread identities:

https://tmail21.com/ttn/123-1234-1234 https://gov2.com/ttn/124-2314-1234

User identity is a critical to the proper functioning of the present invention because the dynamic-chain-of-trust concept is reliant on a user's identity. Standard user party types include without limitation individual users, Ethereum users and organization users. Their address formats are as follows:

TABLE 3

| User type | Address Format |
|---|---|
| individual | userprefix$<governorDomainName> |
| organization | userprefix$orgname.<governorDomainName> |
| Ethereum | ethereumaddress$ethereum.<governorDomainName> |

Table 4 shows non-limiting examples for each user type.

TABLE 4

| User type | Example |
|---|---|
| individual | jsmith$tmail21.com |
| organization | jsmith$org27.tmail21.com |
| Ethereum | 123f681646d4a755815f9cb19e1acc8565a0c2ac$ethereum.tmail21.com |

According to a non-limiting embodiment, governor(s), standard parties (senders) and VAPs must be on-chain parties. This means that they must have an Ethereum address if the blockchain in question is the Ethereum Blockchain. Standard parties who only receive communications (recipients) may be on-chain or off-chain. They only receive anti-spam payouts if they are on-chain.

According to a non-limiting embodiment, certified threads are hybrid entities. They consist of two parts called "twins". An off-chain fat twin is maintained confidentially by a governor. An on-chain thin twin is governed on a public blockchain. Such an arrangement facilitates maintaining private transactions (or C-transactions) directly on the blockchain.

The governor will allow parties to a certified thread to retrieve the unencrypted contents of the certified thread (the fat twin). Users may also interact with the certified thread via the governor fat twin.

Once a changeset has been C-sent, C-forwarded, C-updated, C-instantiated or the like, the role of the governor is done. The proof-of-state, proof-of-existence, postponed-proof-of-existence, proof-of-true-copy, proof-of-c-forwarding, proof-of-sending, proof-of-instantiation and the like, can be accomplished using only the thin twin smart contracts. Users requesting the proofs must supply the corresponding fat twin information.

Unlike blockchain identities, identities of the present invention identities are not meant to be pseudonymous (except for the Ethereum user type). This is because, in general, the present invention use-cases require knowledge of identity. All the present invention identities are confidential and only known only to the parties to the thread. The identities and content are maintained in the fat twin. In the public thin twin, only Ethereum identities of senders are known.

According to one non-limiting embodiment, email addresses may only be used for receiving. If a user needs to C-transact, an Ethereum user or individual/organization user with an associated Ethereum address (assuming the Ethereum Blockchain is being used) must be utilized. If a user C-sends a communication to an email address, they can access the certified thread through a process known as binding.

Table 5 shows the validations that occur for each type of identity.

TABLE 5

| Identity Type | Validation |
|---|---|
| organization | domain Name |
| organization user | domain Name and associated email address |

TABLE 5-continued

| Identity Type | Validation |
| --- | --- |
| individual user | associated email address |
| Ethereum user | owns the associated Ethereum address |

Ethereum users have an on-chain identity. Individual and organization users have an off-chain identity and may optionally have an on-chain identity. To maintain an on-chain identity the individual or organization user is verifiably associated with an Ethereum address using their off-chain identity. Such an arrangement reduces the complexity of setting up an Ethereum address. An associated Ethereum address is not required if the individual or organization user only receives communications.

According to one non-limiting embodiment, senders of changesets (C-sends, C-forwards, C-instantiate and the like) must have an on-chain identity whereas recipients may optionally have on-chain identities. However, recipients only receive anti-spam-payouts if they have an on-chain identity. In all cases, the thin twin only exposes on-chain identities, such as the Ethereum addresses. In the case of individual and organization users, the Ethereum address is the contemporaneous associated Ethereum address at the time of the C-transaction.

Identities, beyond the basic identities described above, rely on dynamic chain-of-trust. For instance, with a passport identity, either the government agency that issues passports or a notary would C-send an enhanced identity attestation to the user. The user can then C-forward any enhanced identity attestation to any other user or organization that requires it. Such an arrangement also permits easily bootstrapping additional identities. For example, once a user receives a passport identity attestation, they could C-forward it and also their separately received driver's license attestation (C-Sent by the Bureau of Motor Vehicles) to the bank in order to open a bank account. Once the bank receives this they can C-send the user a proof of bank account.

Each attestation, such as a passport, driver's license, proof of bank account and the like, is an independent communication. The user may C-forward these enhanced identities to other users/organizations they wish to. Thus, dynamic chain-of-trust is integral to bootstrapping enhanced levels of identities from the basic identities inherent in the system.

Full-service governors are governors that provide VAP services in addition to basic governor services. TMail21 is an example of a full-service governor. In addition to basic changeset validation, it also acts as an integrated witness VAP, an integrated backup VAP, an integrated smart template VAP and an integrated search VAP. It may also act as a notary VAP. These are integrated VAP services and are not-separable from the validation service. However, TMail21.com will support external VAP Services.

According to a non-limiting embodiment, certified operations include without limitation C-send, C-update, C-forward, C-readAck, C-instantiate, C-clone, C-drop and C-dropUpdate. For each of these certified operations there are three distinct workflows, including without limitation an execution workflow, audit workflow and a certification workflow. The execution workflow is the main execution of the certified operation. The audit workflow is an optional audit operation that is done by an auditor VAP to act as a check against a malicious governor. The certification workflow is the workflow that allows any party to the operation to prove that the particular operation did indeed occur with time, content and parties as indicated.

The hybrid structure of fat twins validated and stored off-chain, and thin twins validated and stored on-chain, solve blockchain scale issues relating to size as well as blockchain confidentiality issues. However, this structure by itself does not solve other blockchain including scale rate and the problem of orphaned blocks.

In one non-limiting embodiment, a confidential-blockchain-within-a-blockchain approach is used to massively increase scalability. The governor groups multiple changesets across multiple certified threads that have been created within a predefined time interval into confidential (off-chain) blocks. Inner blocks are referred to herein as CBlocks to distinguish them from the containing blockchain blocks. A CBlock block contains a series of [TTN, CS, SAC] records. The governor then computes a corresponding off-chain public CThinBlock. A CThinBlock contains a series of [TTN, CS, $SAC_H$, $SSAC_H$] records. Each CBlock and its corresponding public CThinBlock has a sequentially increasing block number. Next, the governor computes the CThinBlock Hash (CThinBlock$_H$) and each of the $SAC_H$ and $SSAC_H$ records of the CBlock are combined into a Merkel Hash (CThinBlockMerkelRoot$_H$). Finally, only the [CBlockNumber, CThinBlock$_H$, CThinBlockMerkelRoot$_H$] is written to the outer (main) Blockchain. In this manner thousands of records (Certified Operations) are compressed into a single record. The governor also writes the public CThinBlock to a decentralized file service, such as without limitation IPFS, where the CThinBlock can be retrieved based on the CThinBlockH. Instead of a CThinTwin smart contract, this embodiment has a CThinBlock smart contract. This smart contract validates on-chain that the CThinBlocks are being written with sequential CBlockNumbers. The certification proofs in this embodiment take an additional argument which is the list of public CThinBlocks which can be retrieved from the decentralized file storage (e.g., IPFS). The prover will need to validate all COperations from the start of the Blockchain. In practice, this can be done by auditor VAPs rather than each prover. Auditor VAPs can then make attestations regarding the validation of the CThinBlocks.

For coin operations, scalable payment solutions which can sustain a much higher transaction rate like the Raiden Network on Ethereum or Lightning Network on Bitcoin can be used. The coin operations will occur synchronously with the certified operations whereas the CBlocks are written at periodic intervals. For instance, the CBlocks may written without limitation every 10 minutes.

In one non-limiting embodiment, zkSnarks (zero knowledge succinct non-interactive argument of knowledge) are used by the governor to prove that the governor ran a particular C-operation validation function, which eliminates the need for an auditor to independently verify that the correct validator function was run by the governor. This is done in a setup step and then in a per-C-operation step.

In the setup step, a validation function, including without limitaiton a C-response validation function, is used to generate a key generator function (zkKeyGenerator), a prover function (zkProver) and a verifier function (zkVerifier). A zkSnark compiler such as ZoKrates may be used for this purpose. Alternatively, these functions many be manually generated.

For each C-response transaction, the governor performs the C-response validation function and generates a computation-proof of having run the validation function by also running the zkProver function which was generated earlier in the setup step. The governor then writes to the C-respond operation on the blockchain thin twin which has been enhanced to accept the computation-proof as an additional argument. The enhanced thin twin smart contract may then verify the computation proof using the zkVerifier function that was generated in the setup step. Because the thin twin smart contract can verify that the governor ran the correct validation function, a third-party auditor VAP is no longer required to make this determination. This has additional the advantage of doing the validation synchronously instead of asynchronously. The downside of this approach is that it is currently viable for only relatively simple validations and will not allow for more sophisticated validations thus limiting the type and degree of certified operations.

In one non-limiting embodiment, a proxy re-encryption scheme is used to hide information from the governor effectively providing end-to-end encryption for the parties to the certified thread. The proxy re-encryption scheme can apply to designated sections or designated attachments (collectively, designated content). The proxy re-encryption scheme requires all parties to the thread to have a public/private keypair and make their public key known to the governor. In order to provide this capability, the sending party generates a symmetric encryption key corresponding to the proposed changeset called a Changeset key that is not known to the governor. The sending party then encrypts the designated content with the Changeset key. The governor cannot read this content as the governor does not know the changeset key. Because the governor cannot read this content, the governor cannot do any validation on this content. Next, the sender encrypts the Changeset key with their own public key to create an encrypted changeset key. Next for each recipient as well as existing writers at this changeset, the sender creates a re-encryption key. Finally, the sender sends the encrypted designated content, the encrypted changeset key and the set of re-encryption keys. The governor re-encrypts the encrypted changeset key to the public key of all or the writers at the changeset. Now all of the writers at this changeset can decrypt the re-encrypted changeset keys to produce the changeset key. This changeset key can in turn be used to decrypt the designated content.

In one non-limiting embodiment, a re-encryption scheme is used to hide information from the semi-trusted governor providing end to end encryption of a designated subset of the information. In this embodiment, on creation of a non-parented certified thread, the sender creates a new base-thread symmetric key (BTSK) and encrypts designated sections (DS) with this BTSK to produce encrypted designated sections (EDS). The BTSK is then further encrypted locally by the sender with the public keys of all recipients creating a list of encrypted-base-thread symmetric keys (EBTSK). The EDS and the list of EBTSK are then sent to the semi-trusted governor. The semi-trusted governor never receives the un-encrypted DS or the BTSK. A recipient can then decrypt the EBTSK using its own private key to get BTSK. The BTSK is then used to decrypt the EDS to produce DS. Other types of certified operations can be classified into response type certified operations (e.g., C-Respond) and parented certified thread creation certified operations (e.g., C-Forward, C-Instantiate, C-Clone). For response type certified operations, the sender determines if new parties are being added to the certified thread. If yes, the sender re-encrypts the BTSK that with the public keys of the additional recipients to produce additional EBTSK allowing the additional recipients to obtain BTSK and thus decrypt EDS to produce DS. For parented certified thread creation operations, the sender encrypts the BTSK from the parent certified thread (which they have in their possession as they must be a party to the parent certified thread) using the public keys of the recipients of the child certified thread to produce new EBTSKs. The EDS are copied unchanged from the parent certified thread to the child certified thread. This allows the cryptographic hash comparisons to continue to work just like for non-end-to-end-encryption sections. The new EBTSK are sent to all recipients of the child certified thread allowing them to decrypt the EBTSK with their private keys to produce BTSK and then using BTSK to decrypt (the copied) EDS to produce DS.

In one non-limiting embodiment, the governor handles orphaned blocks by periodically checking the blockchain to see if some changesets are missing some duration after the changeset has been written to the thin twin. If the changeset is missing, the governor resubmits it to the blockchain. This requires the thin twin contract to be written to accept idempotent writes from the governor. This also requires certification proofs to be able to handle missing changesets. These missing changesets are handled by waiting a certain amount of time which is related to the governor rewrite interval, and then retrying the certification proof.

In one non-limiting embodiment, there is no governor and the fat twin is also written to the blockchain. This requires the blockchain to be able to handle confidentiality as well as large transaction sizes. This may be accomplished by combining a trusted-execution-environment (TEE) based blockchain, such as Microsoft CoCo or Intel SGX Hardware, for confidentiality along with a FileCoin like Blockchain for large size scale. Note that both of these types of blockchains are still in development.

The SAC at a particular TTN-CSN represents the state at Changeset.

```
SAC
{
    Changeset
    {
        int changesetNum;
        String comment;
        List[Attachment] attachments;
        List[User] added_writers;
        List[SectionVer] added_sections;
        List[SectionVer] modified_sections;
    }
    ThreadInfo
    {
        String subject;
        String TTN;
        String threadType;
    }
    SectionsSAC // SSAC
    {
        List[SectionVer] sectionVersAtChangeset;
    }
    WritersSAC
    {
        List[User] writersAtChangeset;
    }
    parentInfo // varies based on if this thread was created by cloning,
    forwarding or instantiation
    {
    }
}
```

In one non-limiting embodiment, the governor generates a random cryptographic nonce and adds it to the SAC. The governor may generate a random cryptographic nonce by any means including without limitation by generating a GUID. Because $SAC_H$ is on a public blockchain, it may be subject to being guessed through trial and error since it utilizes a well-known structure. By adding a cryptographic nonce to the SAC, the $SAC_H$ becomes virtually impossible to guess.

In one non-limiting embodiment, the governor digitally signs the SAC by first computing the $SAC_H$ and then applying a digital signature to $SAC_H$ using an algorithm. This may be done by any known means including without limitation the RSA digital signature algorithm. The digital signature is then added to a sgned SAC structure which is SAC+digital signature. The signed SAC structure, which may be without limitation represented as a ZIP file, is sent to all the writers at the given changeset number. This approach can be used as an alternative to placing [$TTN_H$, CSN, $SAC_H$, $SSAC_H$] on the blockchain. However, this embodiment requires massive additional trust in the governor relative to the blockchain approach. For example, with the blockchain approach, the block timestamp is not generated by the governor and hence cannot be spoofed by the governor. The block timestamp is generated by the blockchain miner. The block timestamp should be very near to the governor-asserted changeset timestamp (within a few seconds). In fact, the block timestamp could be considered the true timestamp of the changeset. The blockchain approach ensures that there is a canonical SAC (and hence $SAC_H$ and $SSAC_H$) at every [TTN, CSN] combination. Using a digital signature approach there is no canonical SAC. The governor could generate multiple conflicting SACs for a given [TTN, CSN] combination at different points in time. For example, at time t1 the governor could generate [TTN, CSN, SAC1] and at time t2 the governor could generate [TTN, CSN, SAC2]. Alternatively, at the same time t1, the governor could send [TTN, CSN, SAC3] to writer1 and [TTN, CSN, SAC4] to writer2. The fact that there is a canonical SAC at every [TTN, CSN] combination means that auditors, arbitrator VAPs can be assured that they are validating or certifying the canonical SAC. The blockchain approach supports real-time validation audits by Auditor VAPs. However, using the digital signature approach the governor could send a digitally signed [TTN, CSN, SAC, CSP] to an auditor. The auditor can re-validate and digitally sign the audit, but then there is no place to put the canonical audit result that all parties can see. There is also the matter of how to distribute the audit results to all of the parties in such a manner that they agree on the audit result. The governor could generate no output. Parties can check for absence of output by comparing the thin twin smart contract with the auditor smart contract. Furthermore, the digital signature approach doesn't support fully on-chain fat twins and thin twins. Said another way, there is no way for it to support fully decentralized, trustless certified messaging and collaboration which is the long-term goal. With the Blockchain approach, parties do not have to trust the governor that related transactions are properly generated. For example, if a party C-Forwards TTN1 [CS3-CS5] to create TTN2. With the digital signature approach, the parties are required to trust the governor that, for instance, TTN2.FTTN1.CS4.SAC=TTN1.CS4.SAC. With the blockchain approach if these were different, all parties to TTN2 could immediately detect this. With the digital signature approach, all parties could not verify it because in general all parties do not have access to TTN1. Even for a party that does have access to TTN1, it runs into the lack of canonical SAC issue. If, for example, a party C-Clones TTN1 at CS4 to create TTN2. With the digital signature approach, the parties must trust that the governor set TTN2.CS1.SSAC=TTN1.CS4.SSAC. With the blockchain approach, if these were different, all parties to TTN2 could detect this. With the blockchain approach, if these were different, all parties to TTN2 could immediately detect this. With this digital signature approach, all parties could not verify it because in general all parties do not have access to TTN1. Even for a party that does have access to TTN1, it runs into the lack of canonical SAC issue. If, for example, a party C-Instantiates TTNT at R2 to create instance TTNI. With the digital signature approach, the parties have to trust the governor set TTNT.R2.SSAC=TTNI.CS1.SSAC. With the Blockchain approach, all parties to TTN2 could immediately detect this. With this digital signature approach, all parties could not verify it because in general all parties do not have access to TTNT. Even for a party that does have access to TTN1, it runs into the lack of canonical SAC issue. Finally, the digital signature approach doesn't support coin operations which are fundamental to the cryptoeconomic incentives behind certified messaging and collaboration.

In one non-limiting embodiment, a user performs a C-Send, C-Instantiate, C-Forward or C-Clone with a setting that prevents further C-Forwards. This is an artificial suppression of further C-Forwards. This is a way to artificially terminate dynamic-chain-of-trust. This capability may sometimes be useful where users do not wish that their certified message or changeset can be certifiably forwarded to other parties.

Figure 2A:
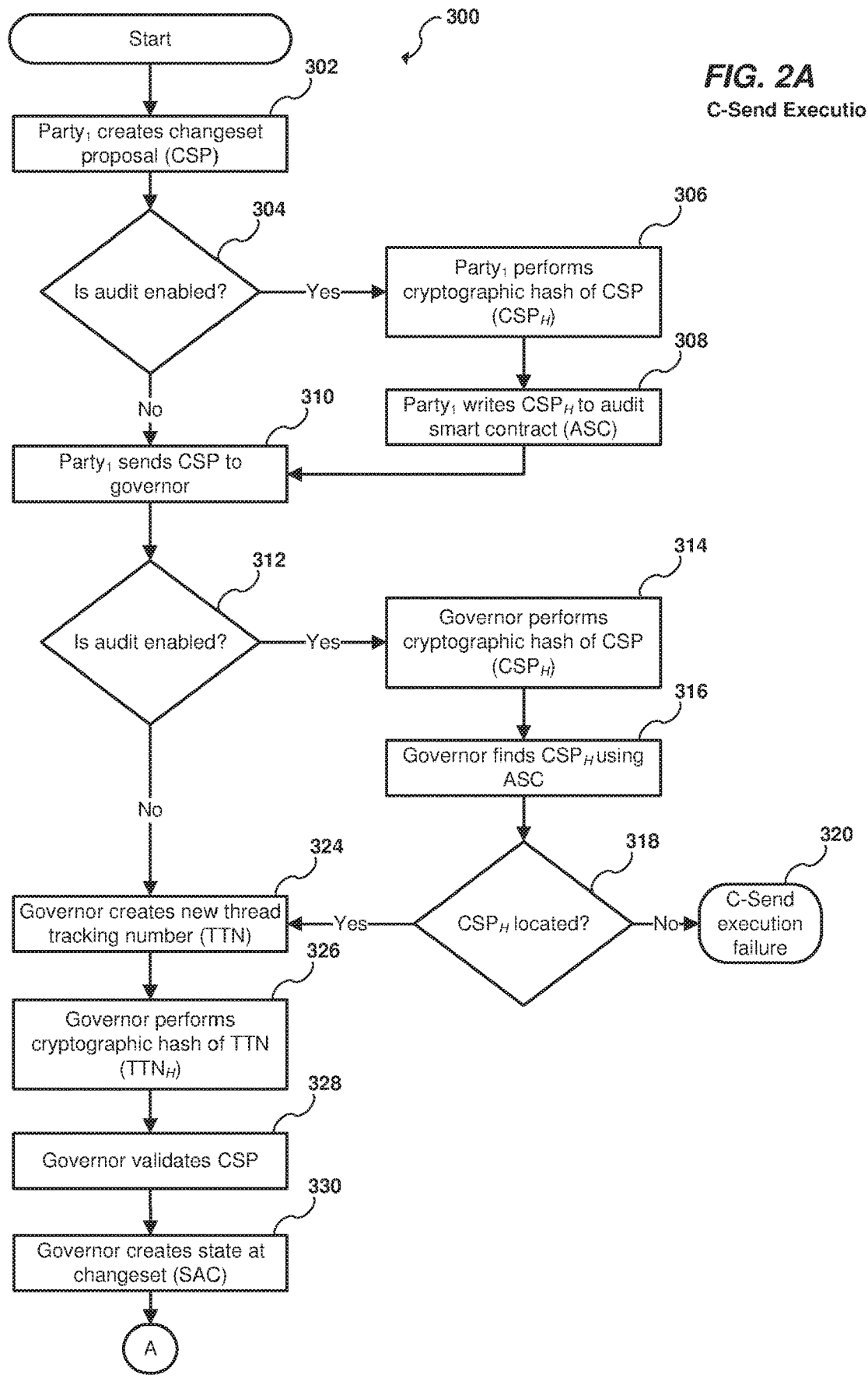
FIGS. 2A-2T, 2V and 2W are flow charts illustrating a method for certified confidential data collaboration in accordance with an embodiment of the present invention.
Figure 2B:
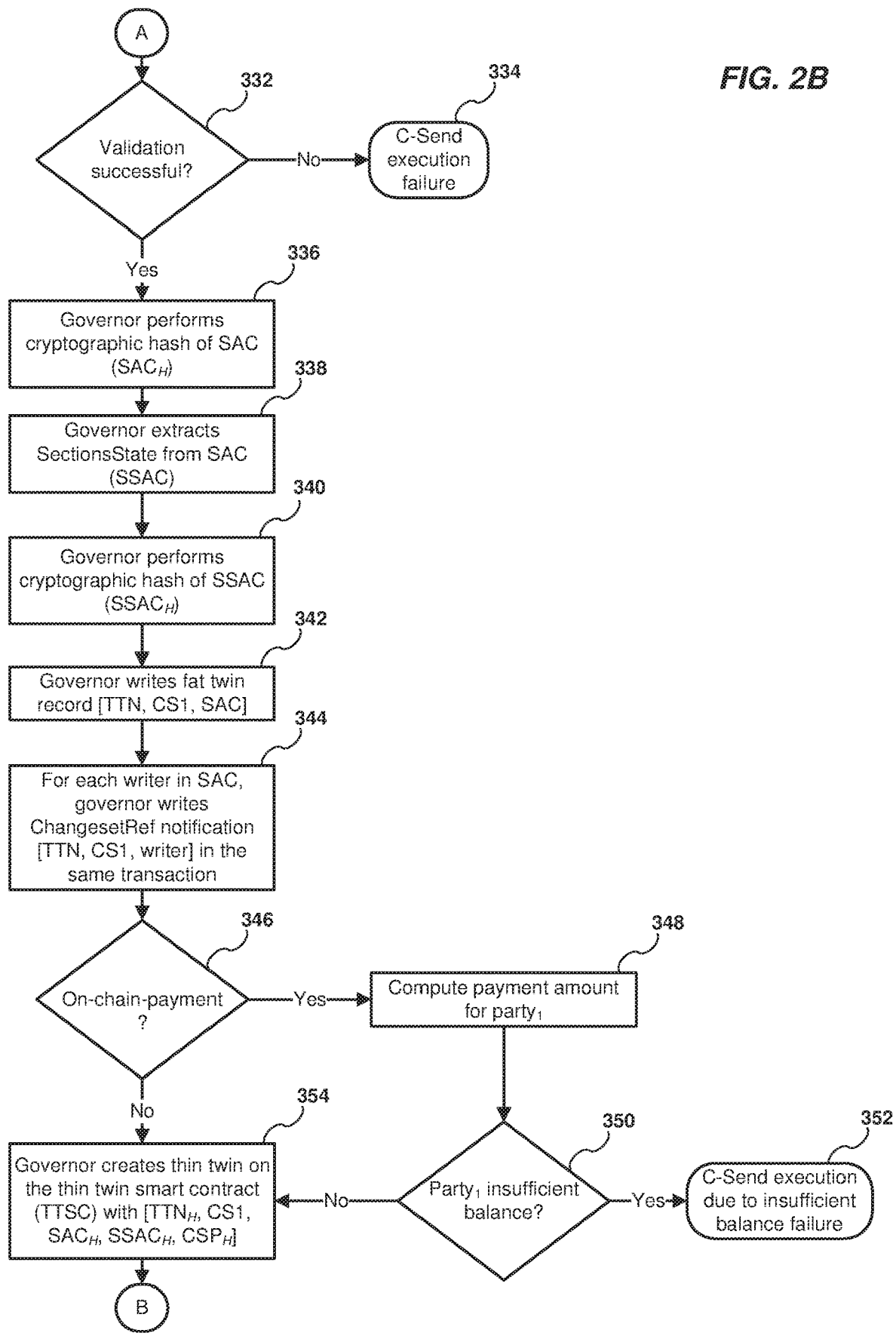
Figure 2C:
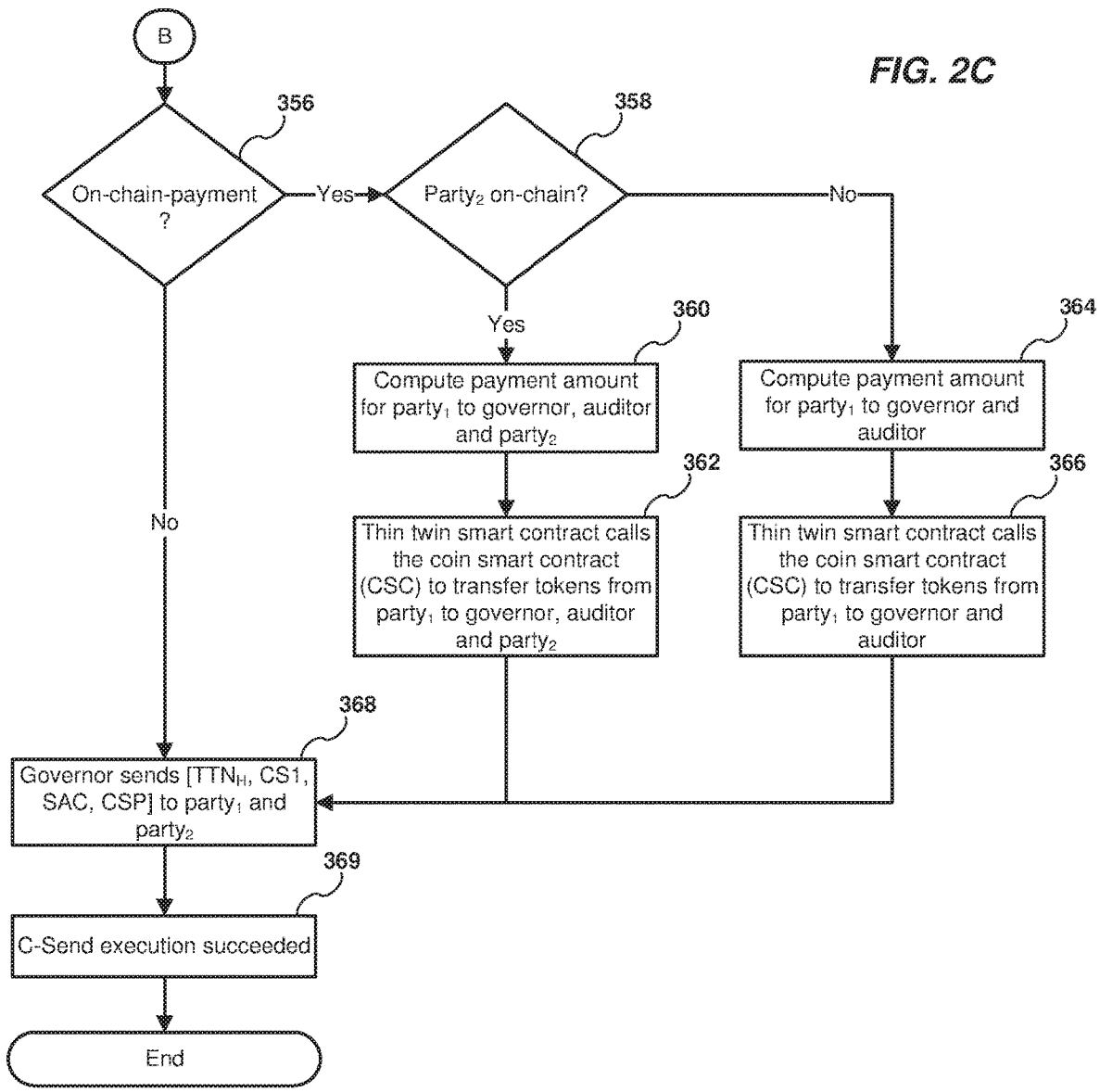
Figure 2D:
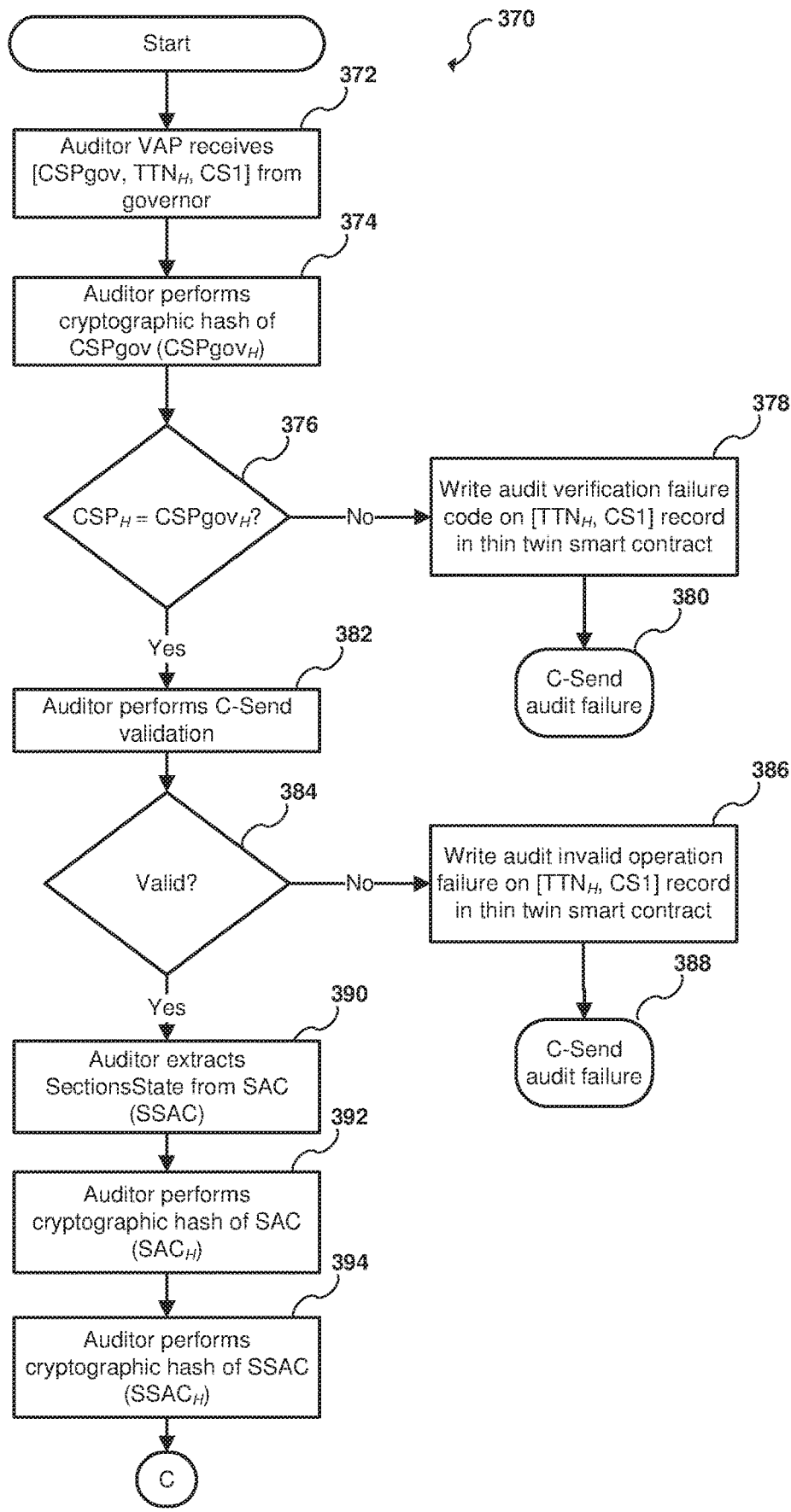
Figure 2E:
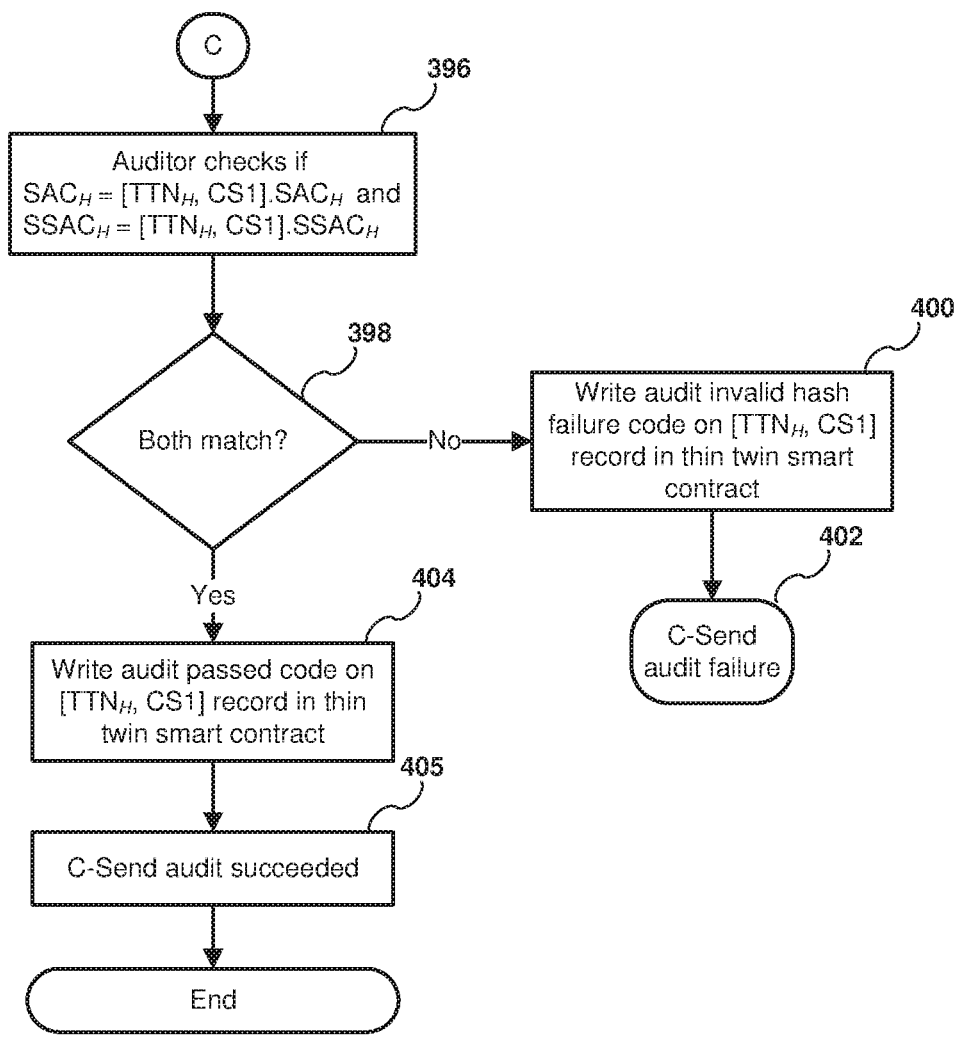
Figure 2F:
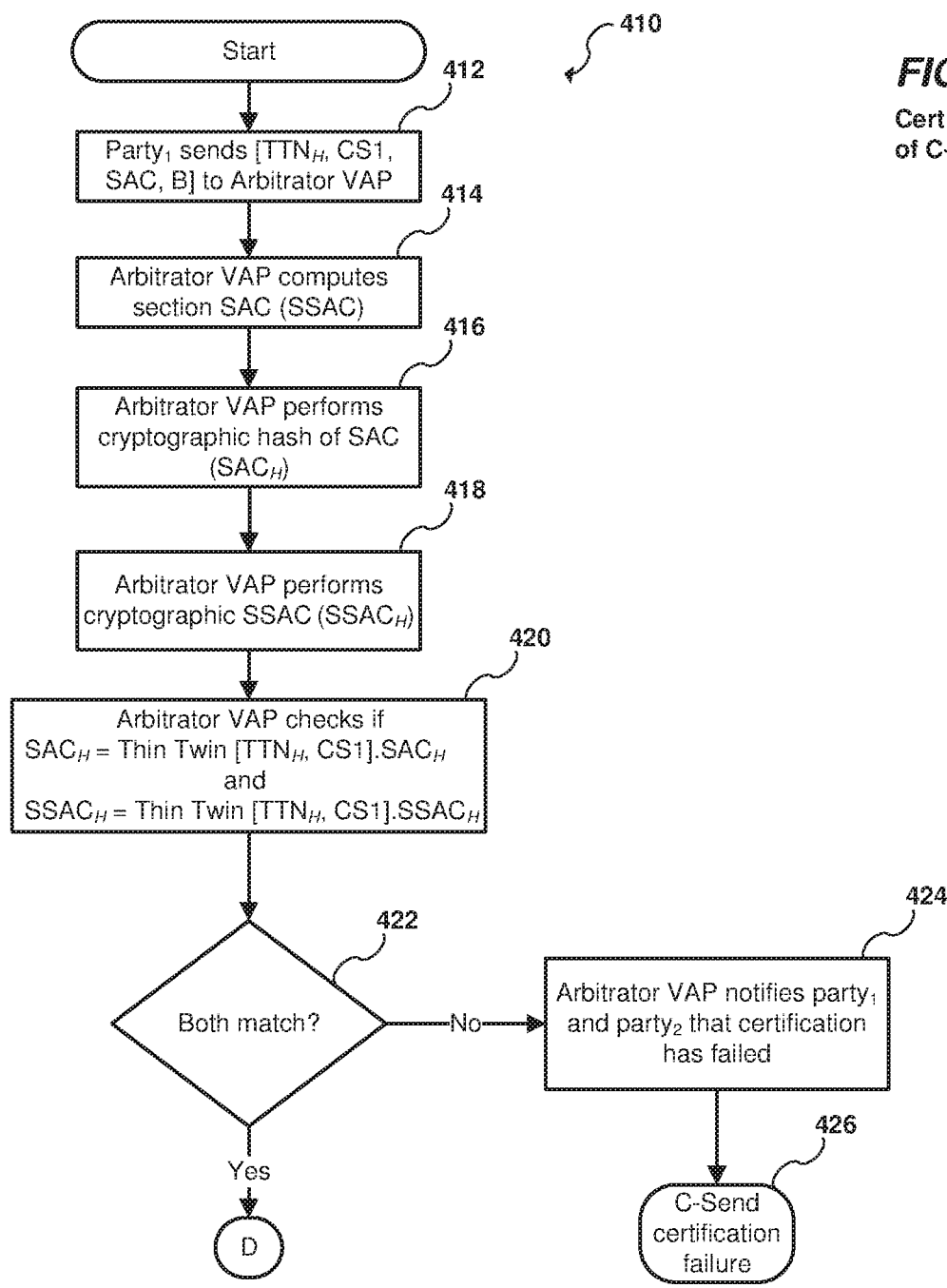
Figure 2G:
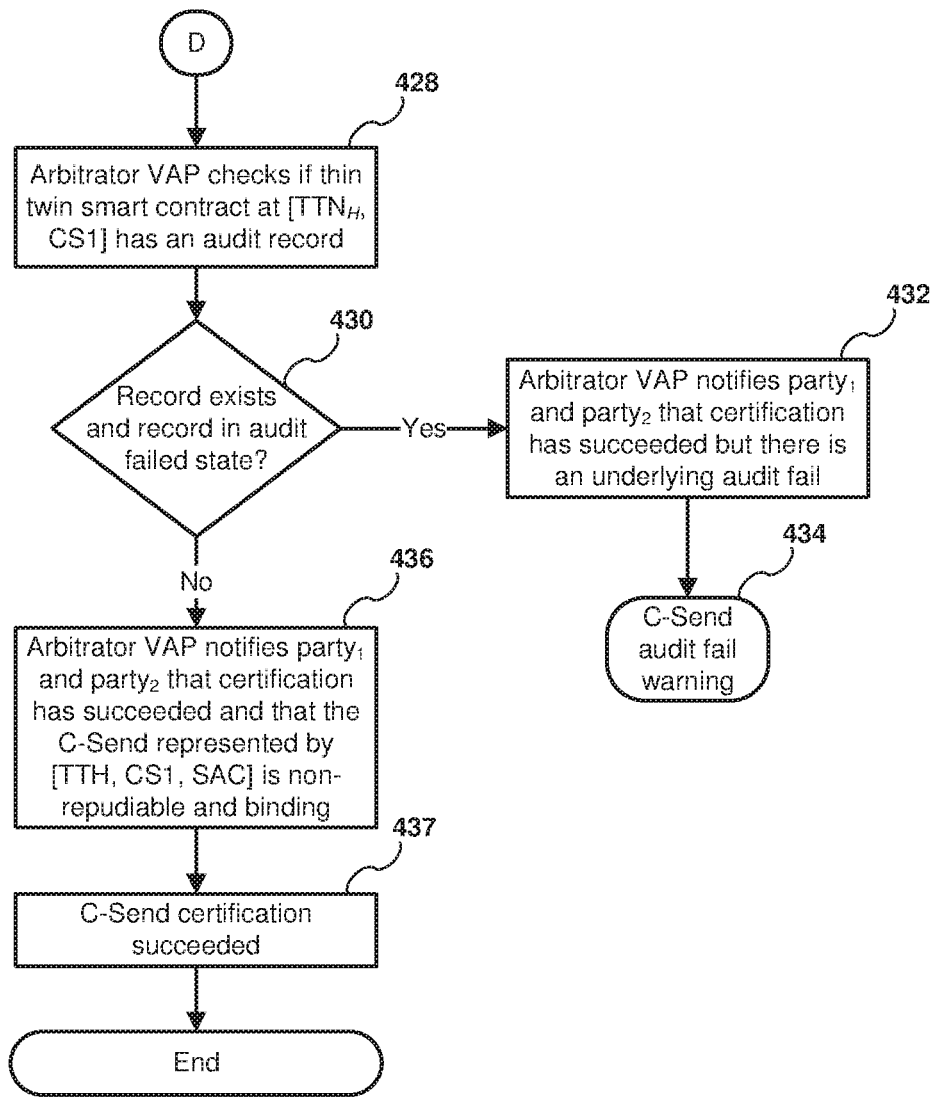
Figure 2H:
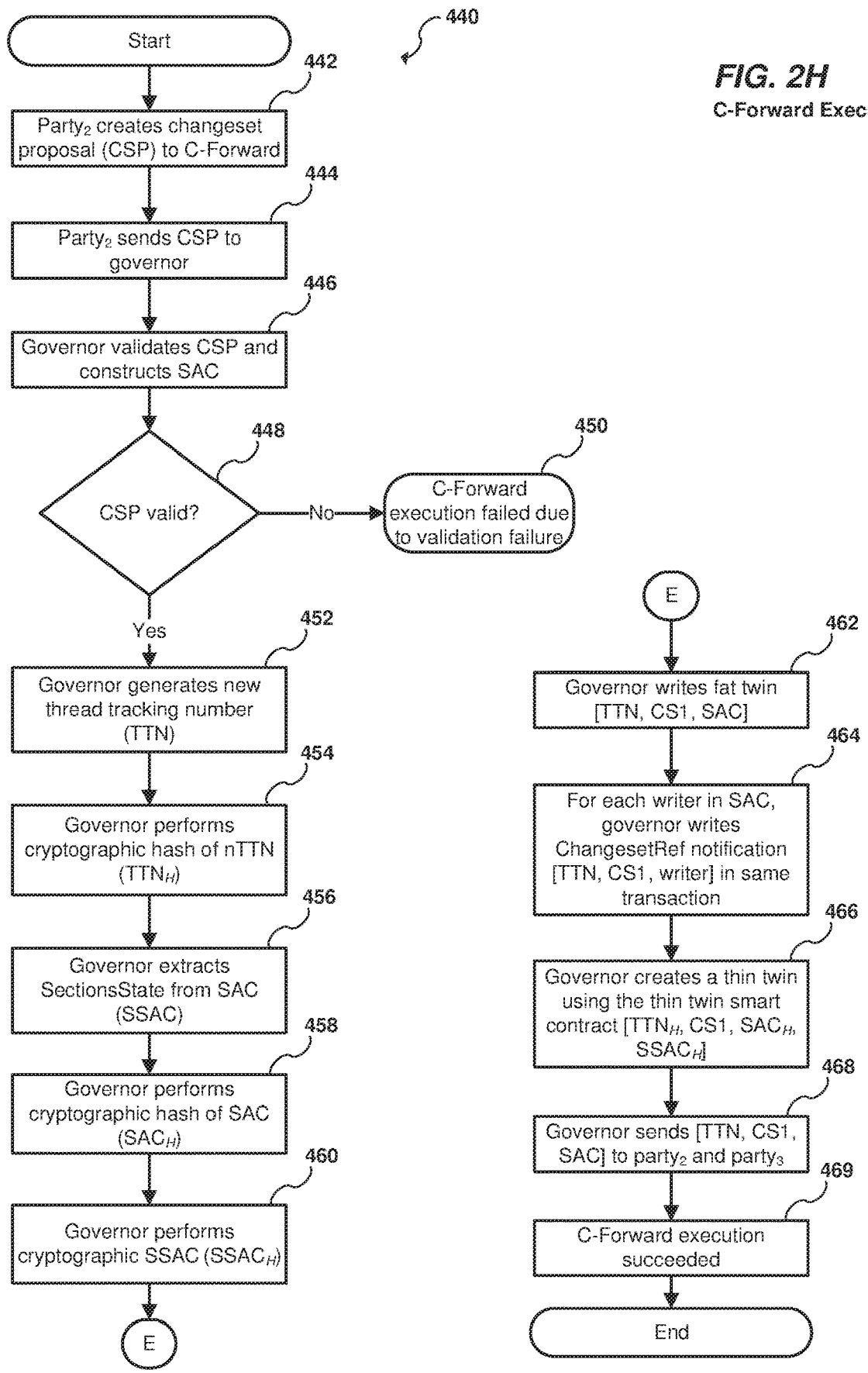
Figure 2I:
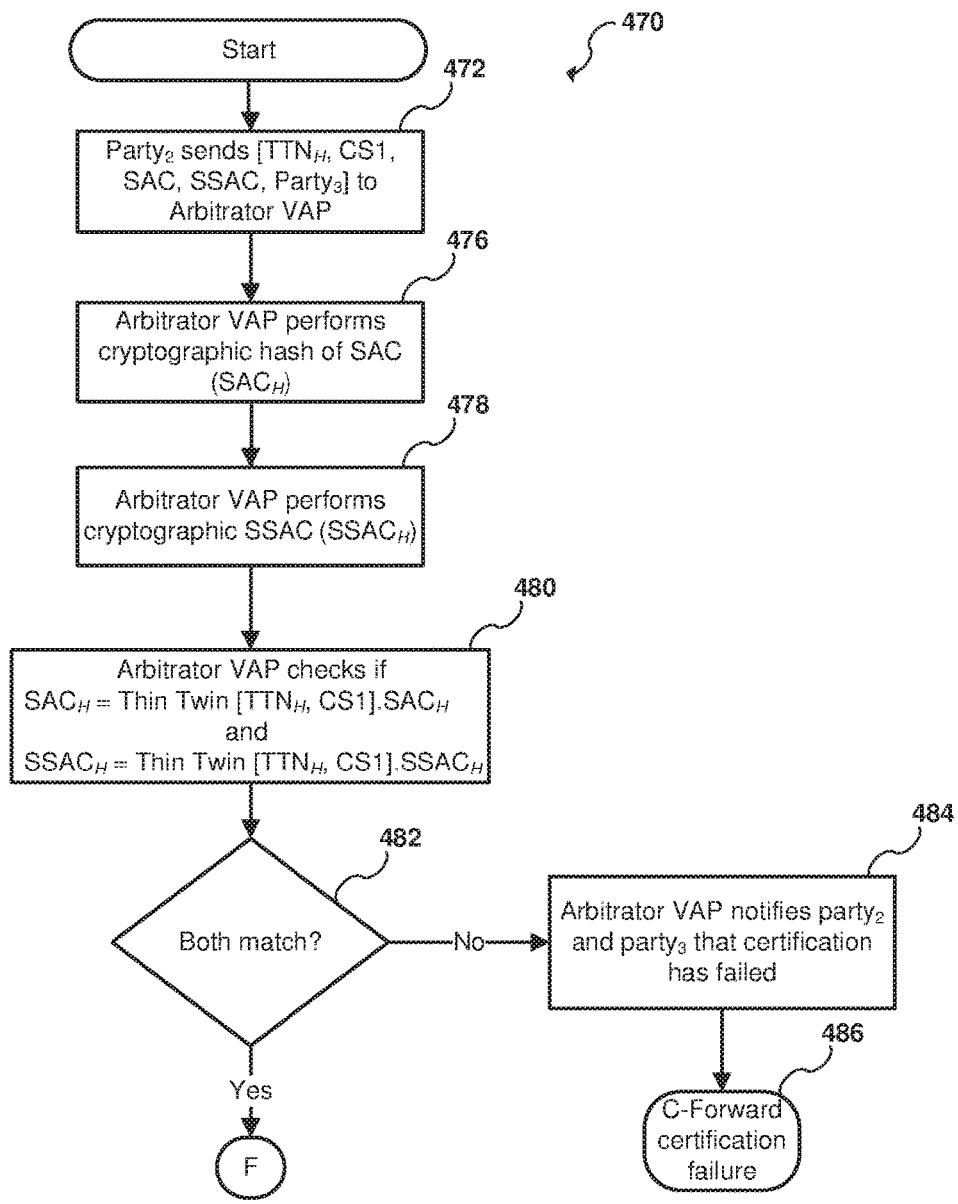
Figure 2J:
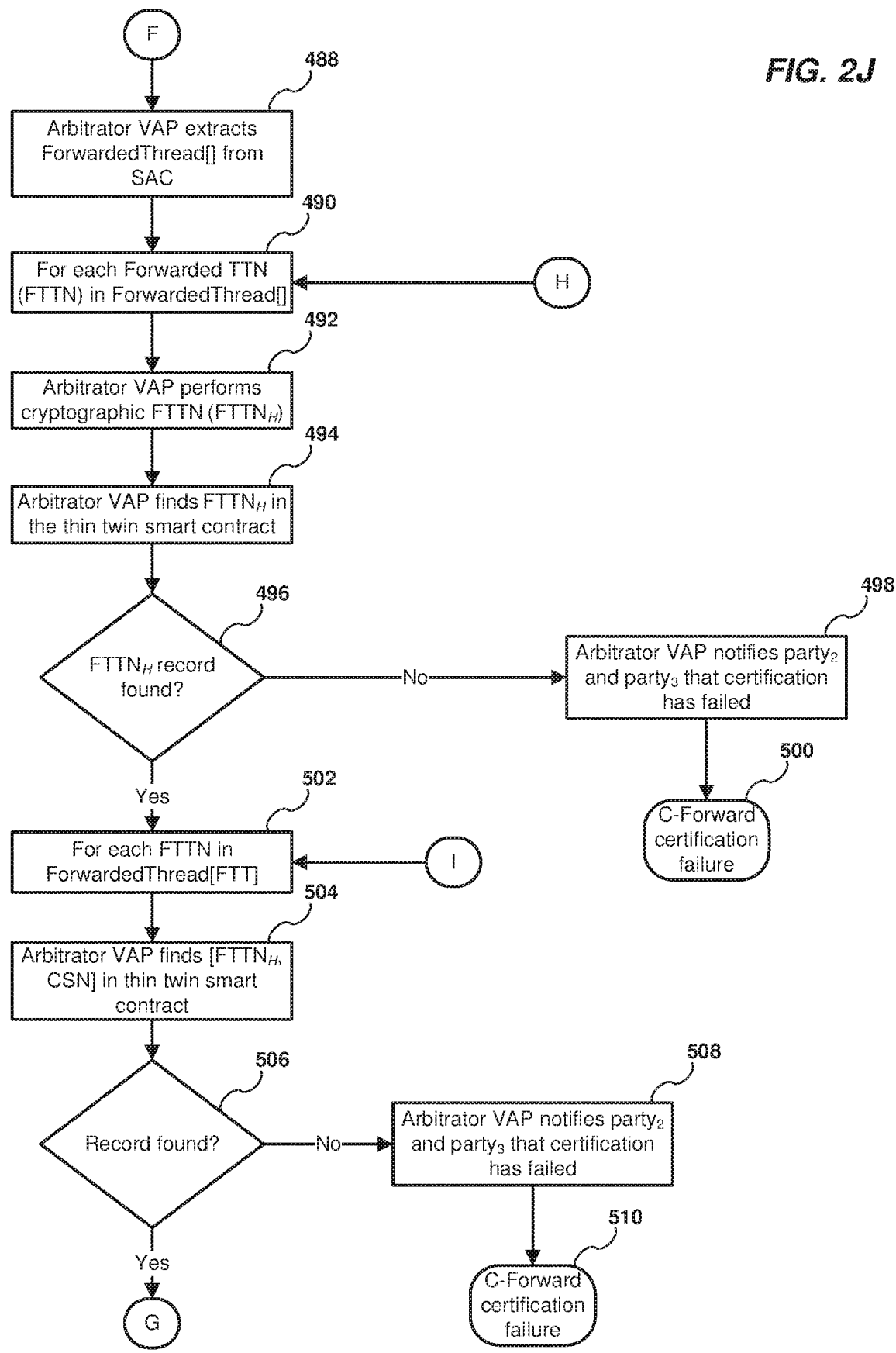
Figure 2K:
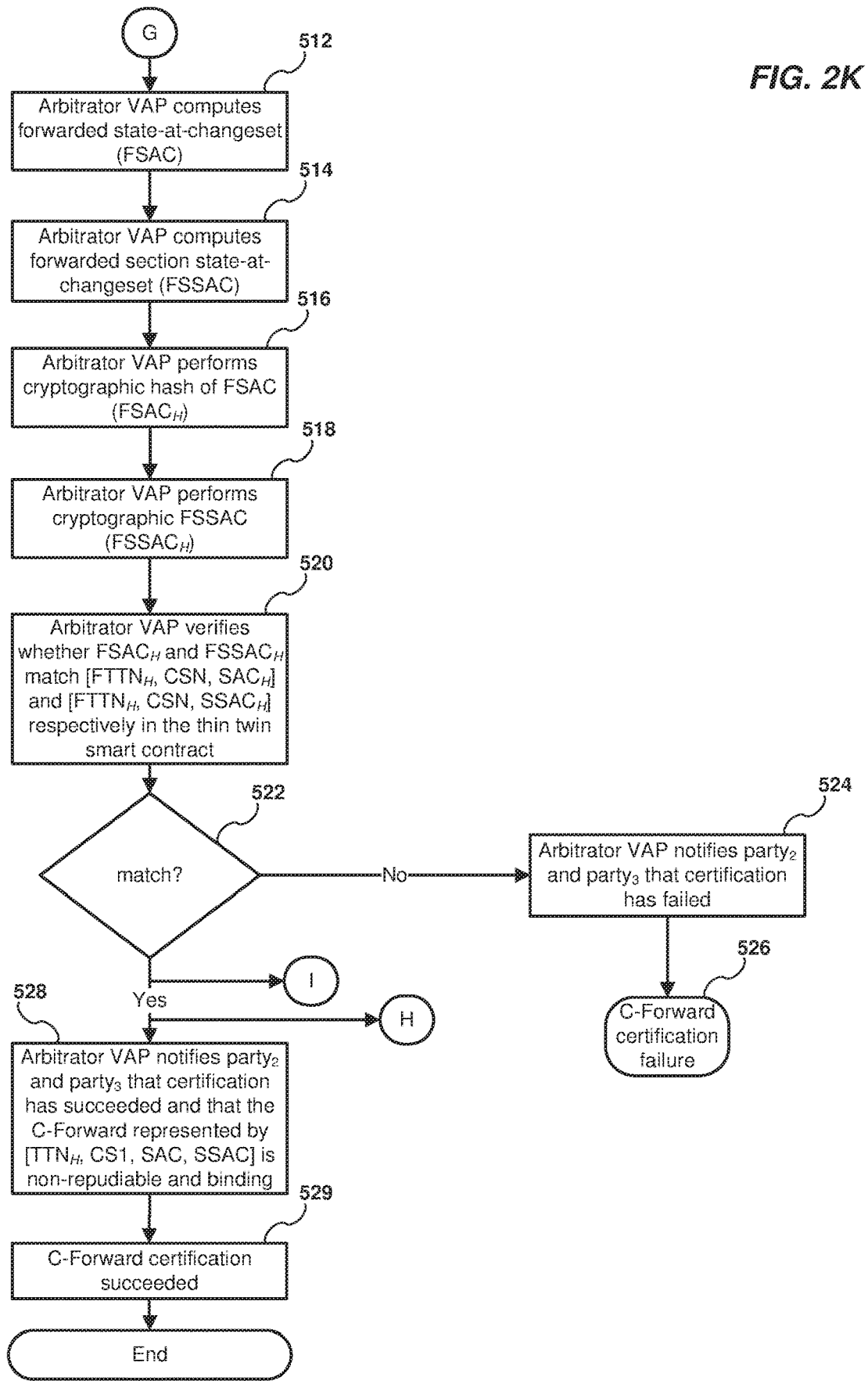
Figure 2L:
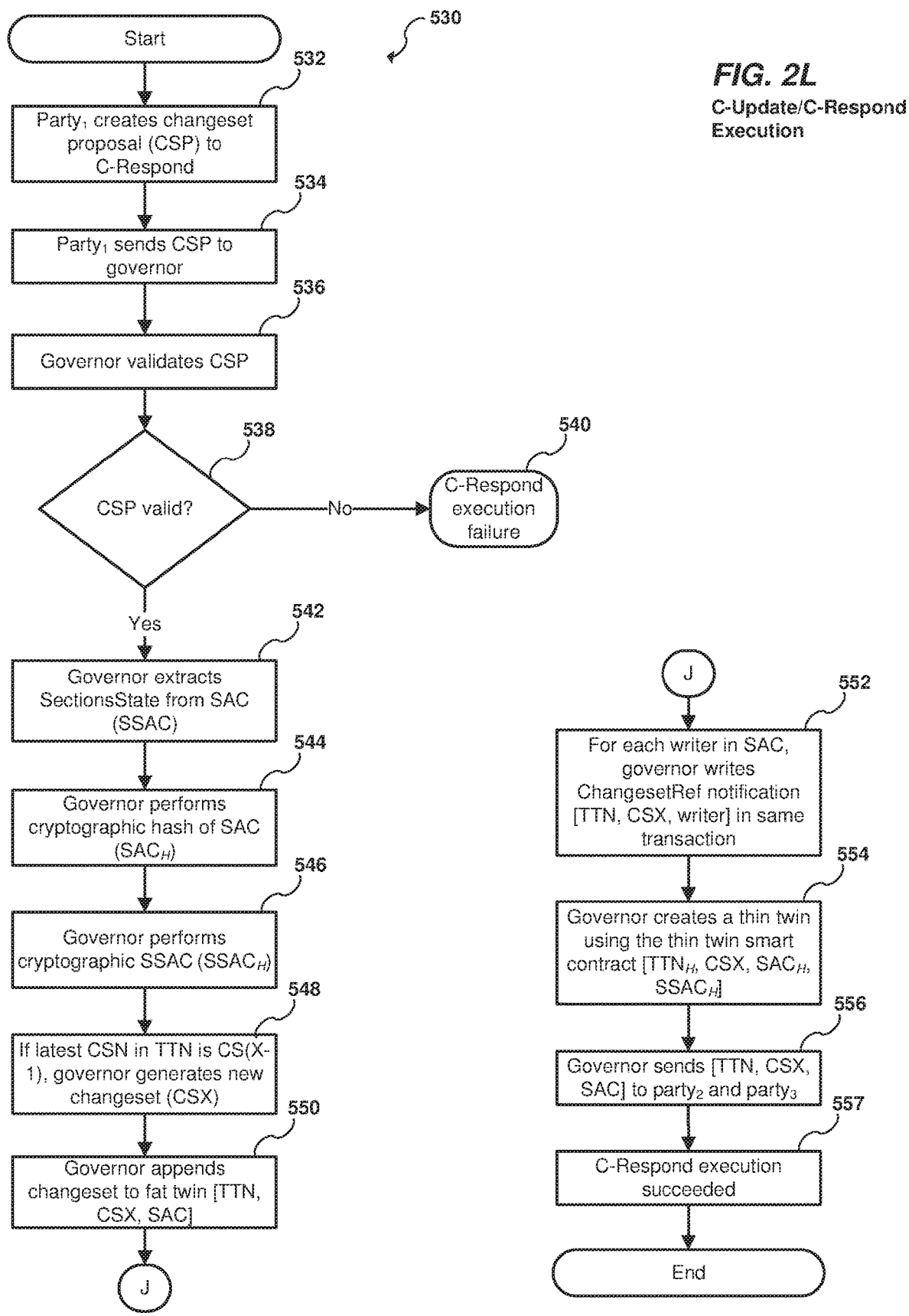
Figure 2M:
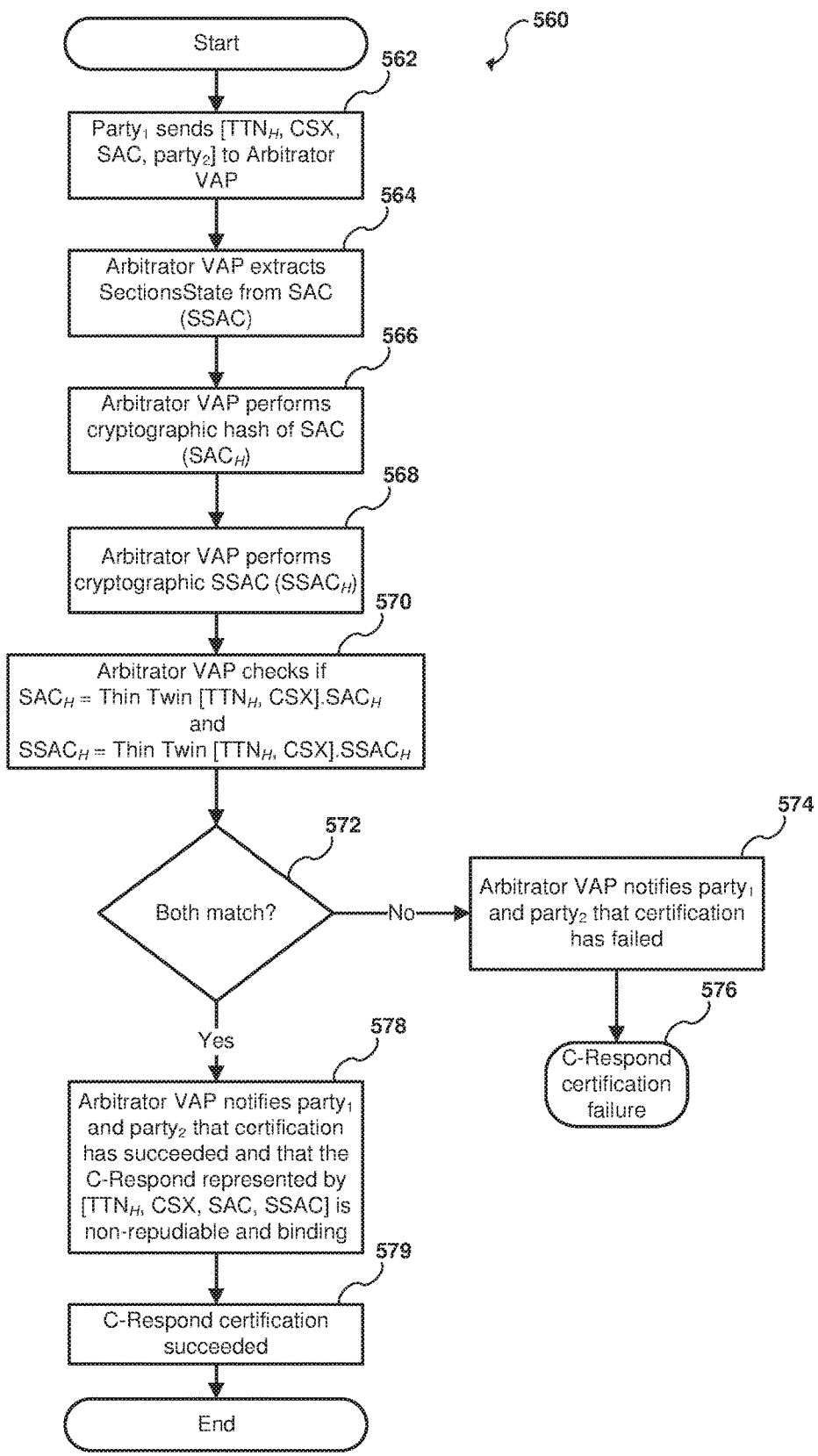
Figure 2N:
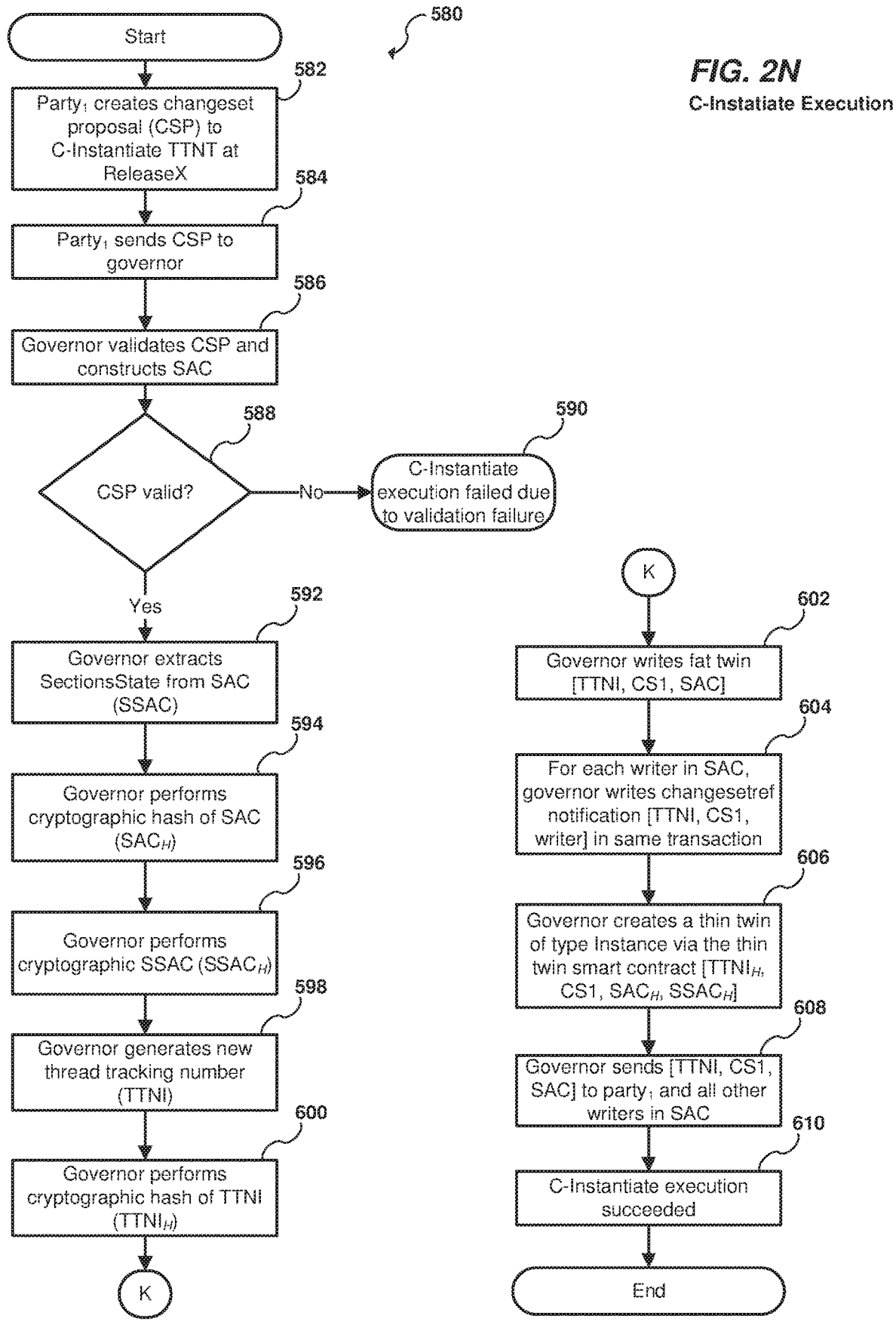
Figure 20:
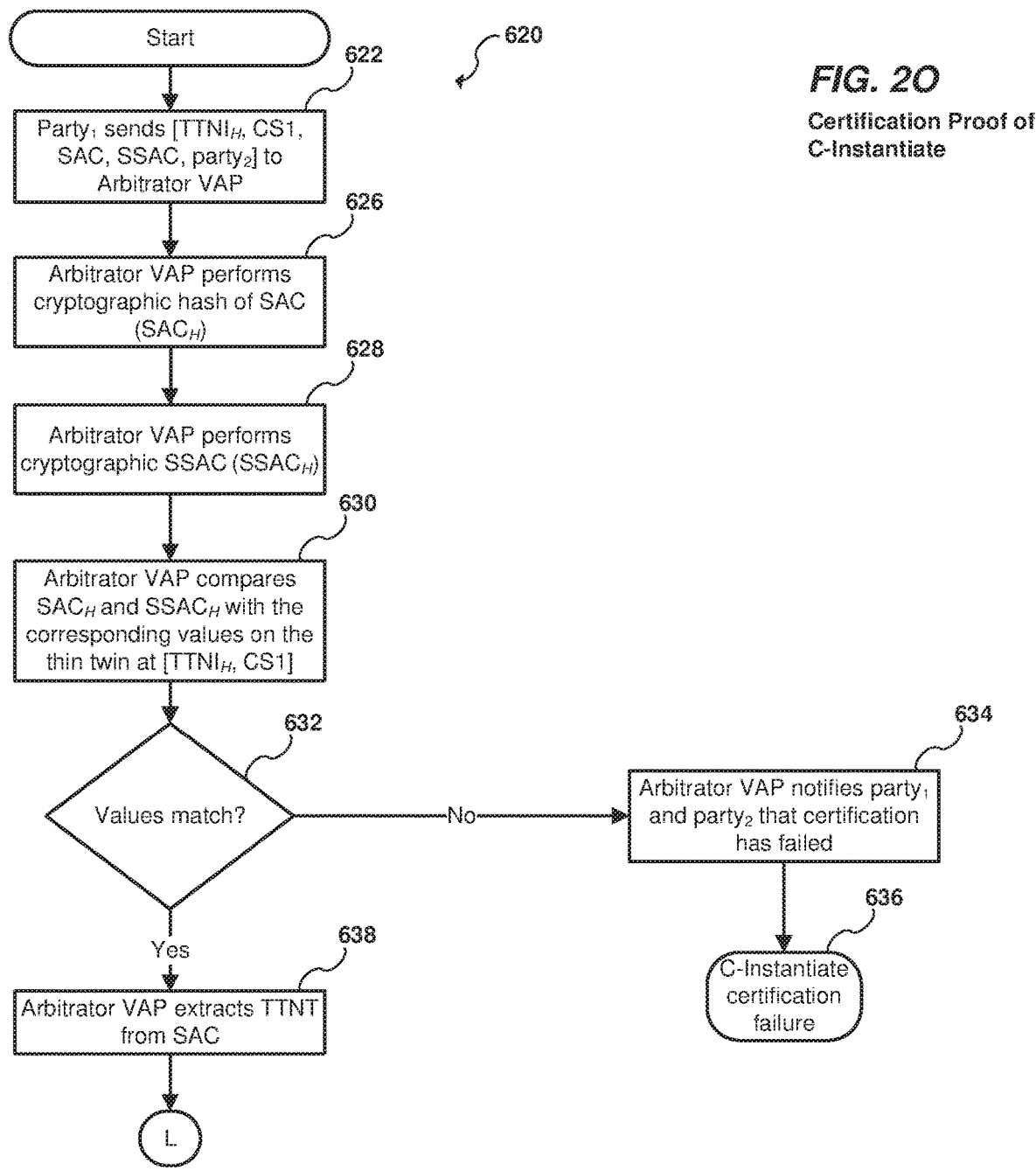
Figure 2P:
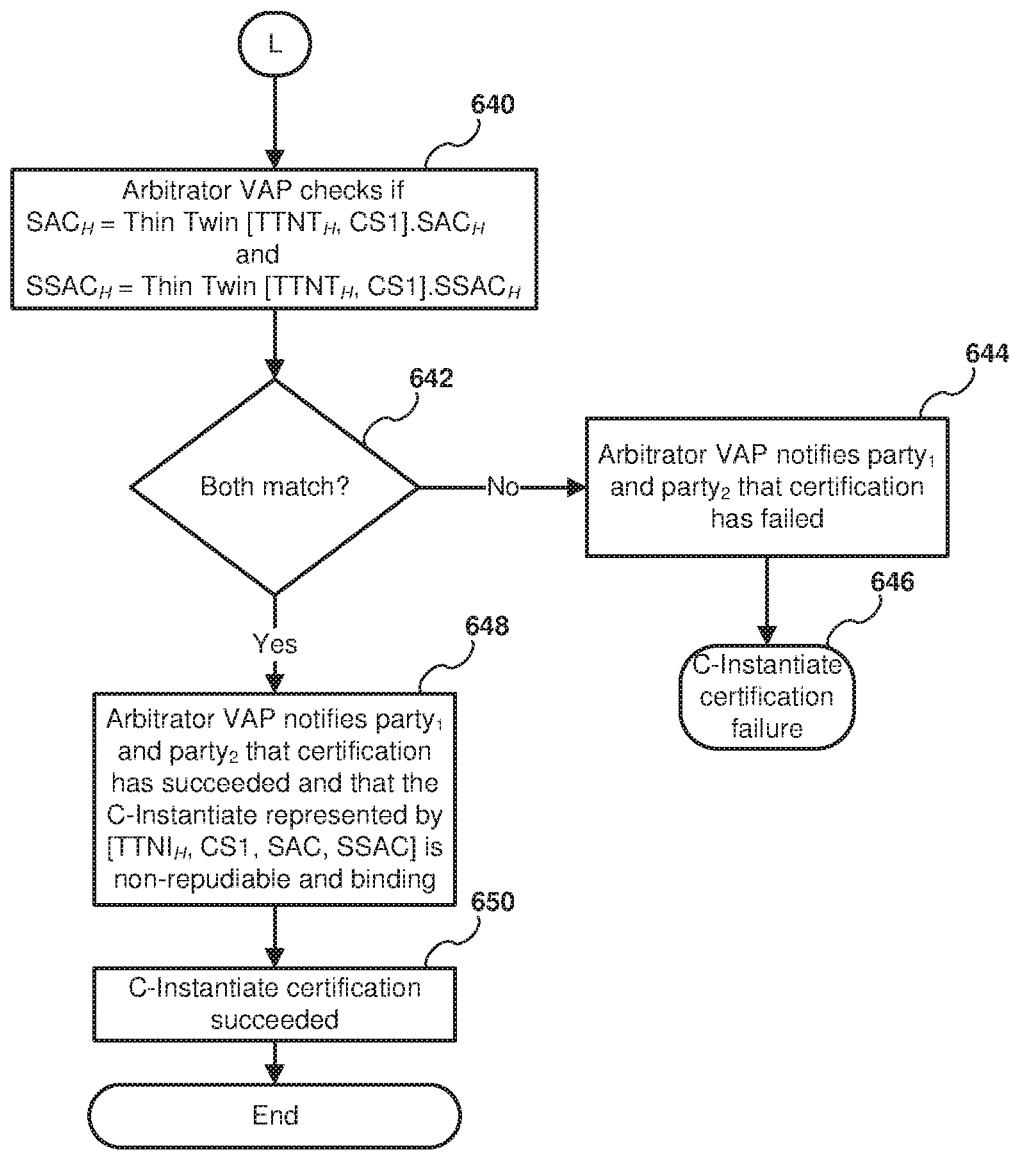
Figure 2Q:
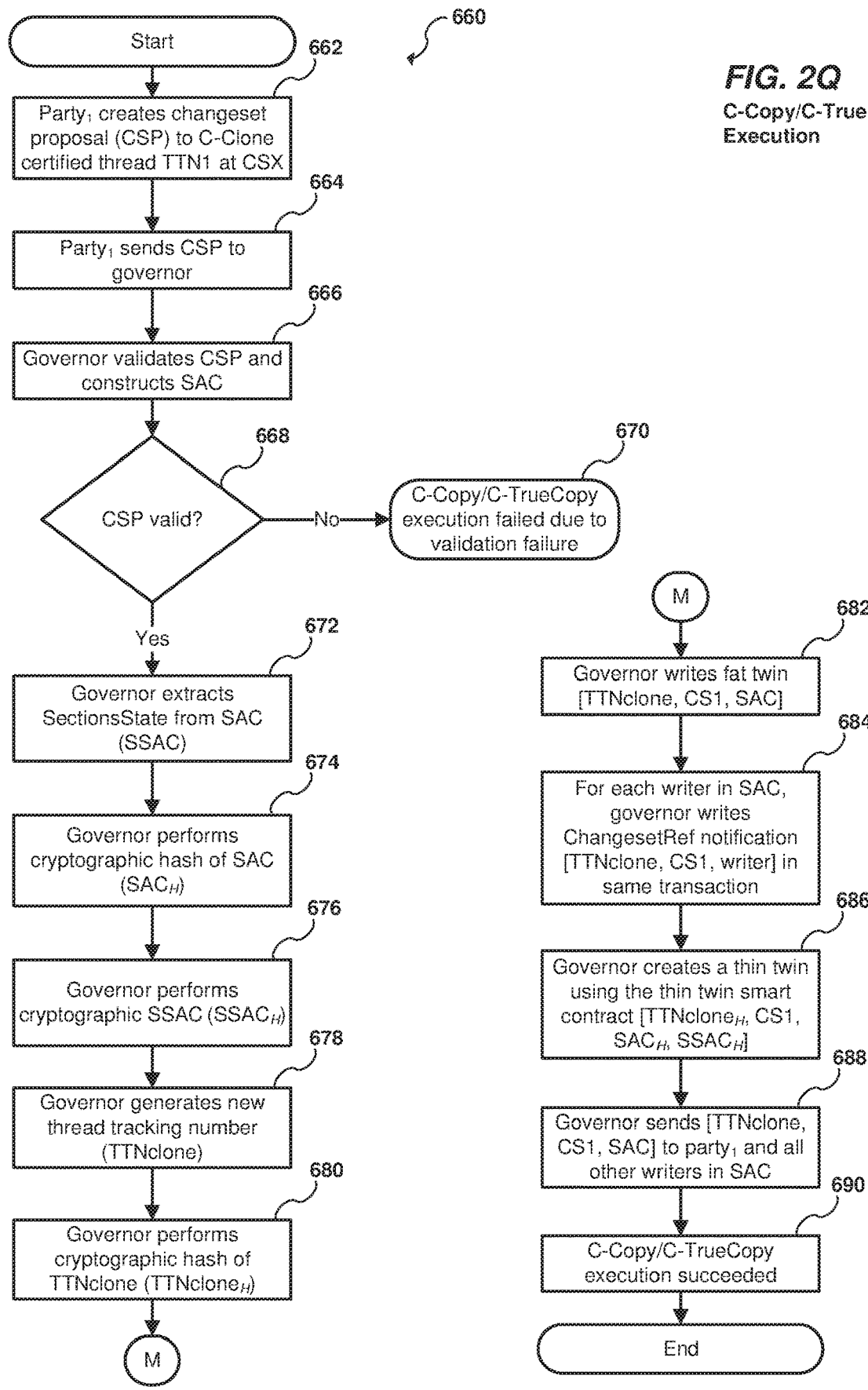
Figure 2R:
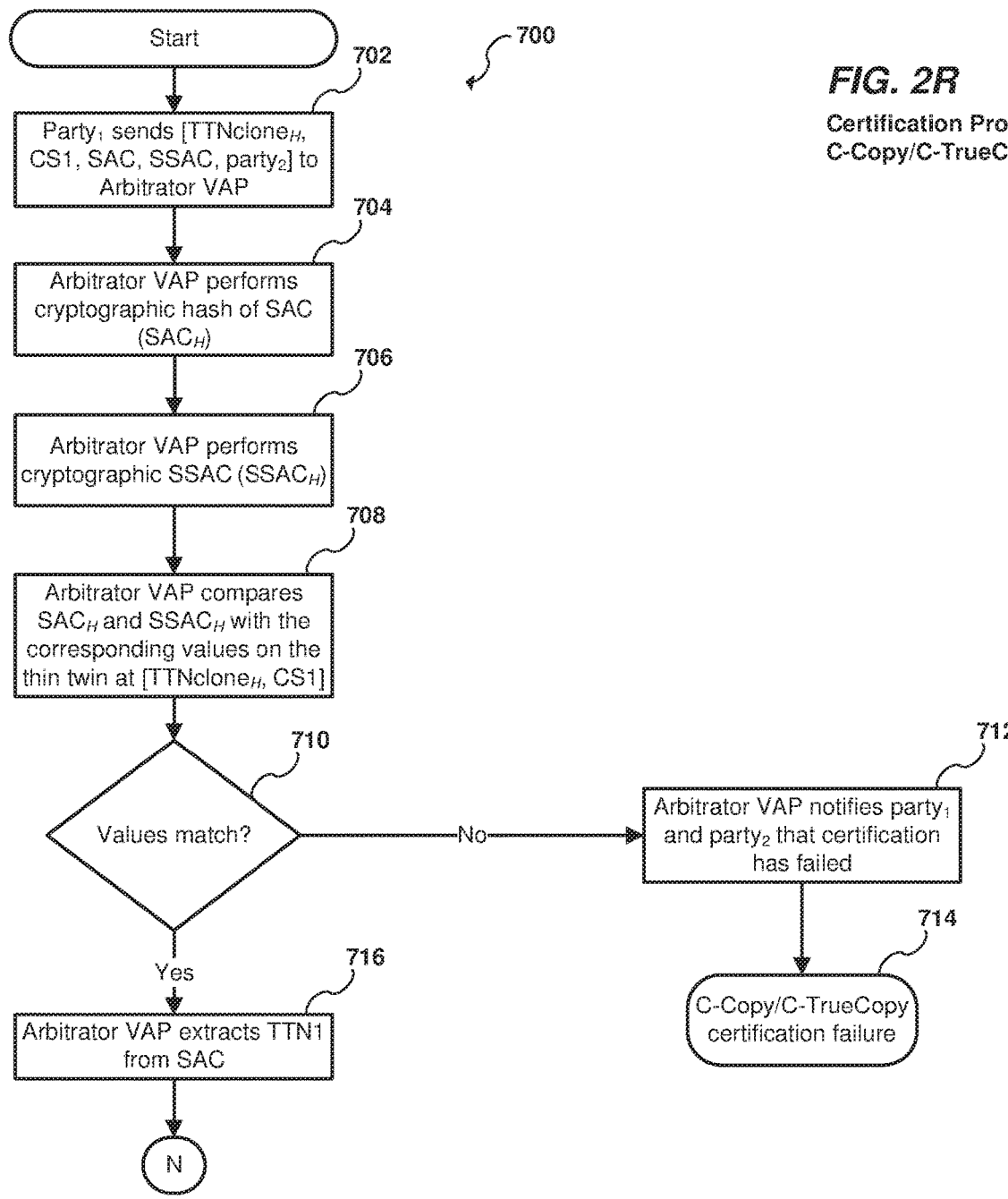
Figure 2S:
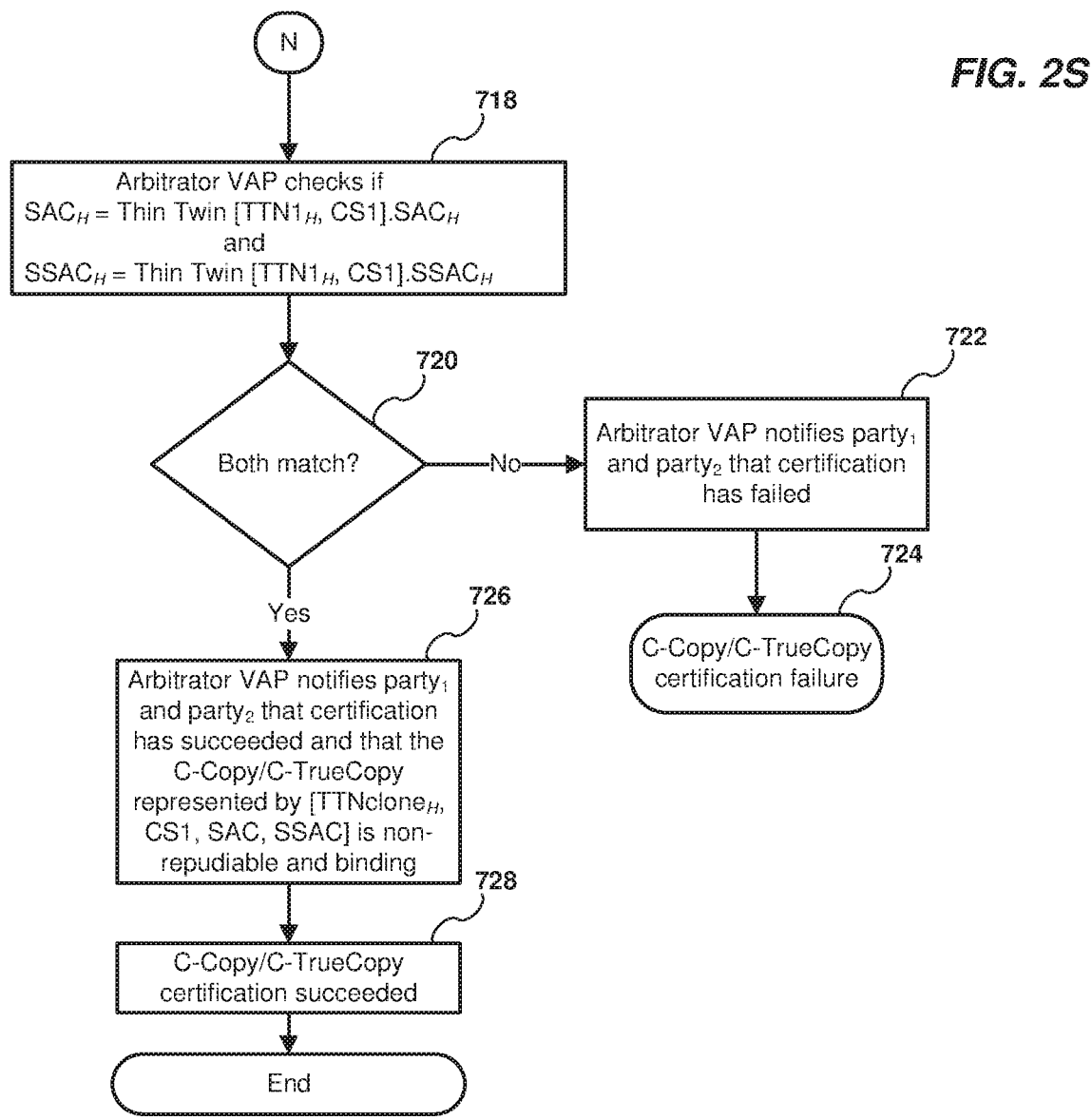
Figure 2T:
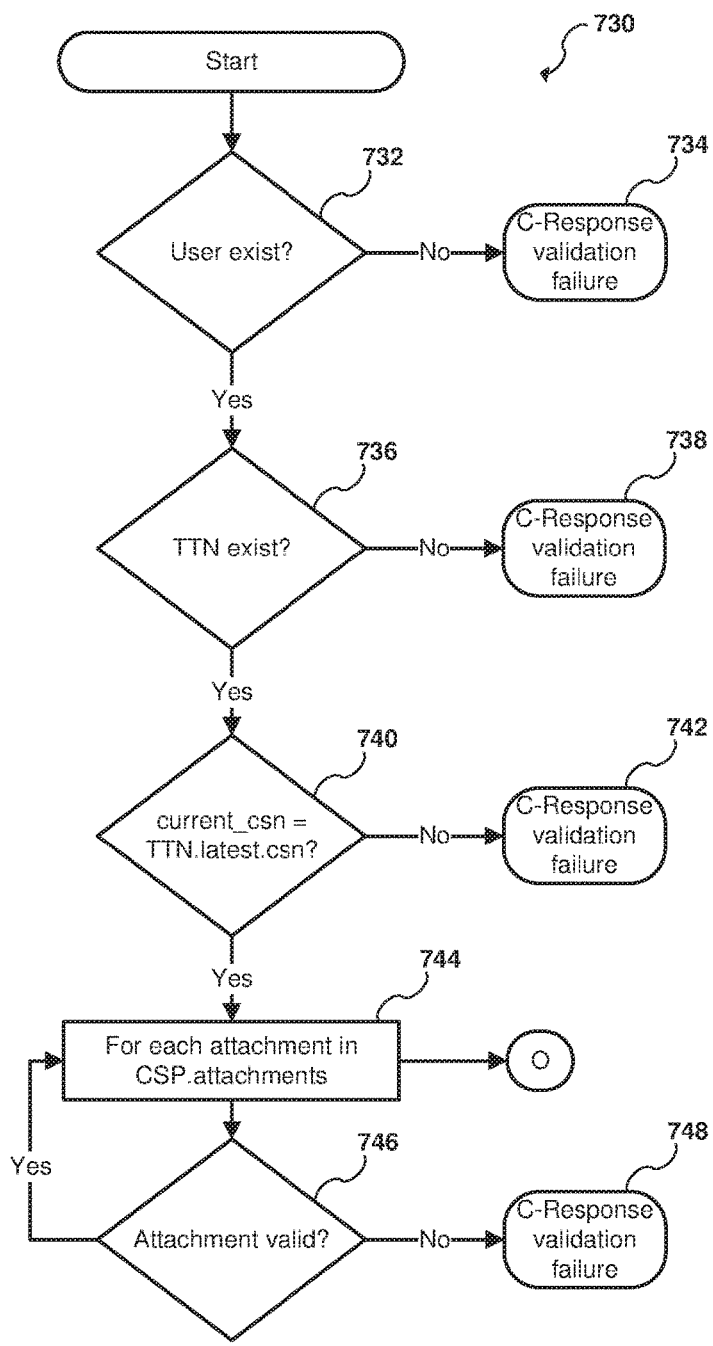
Figure 2V:
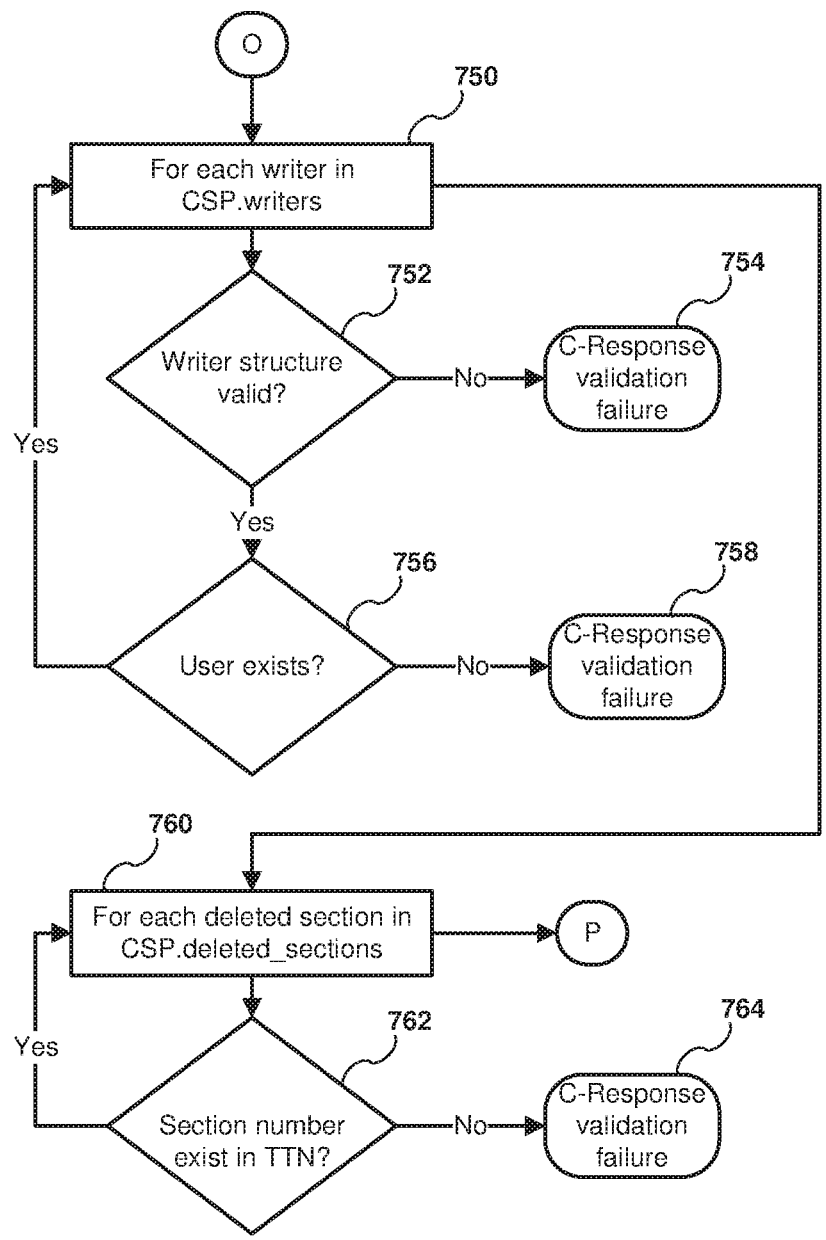
Figure 2W:
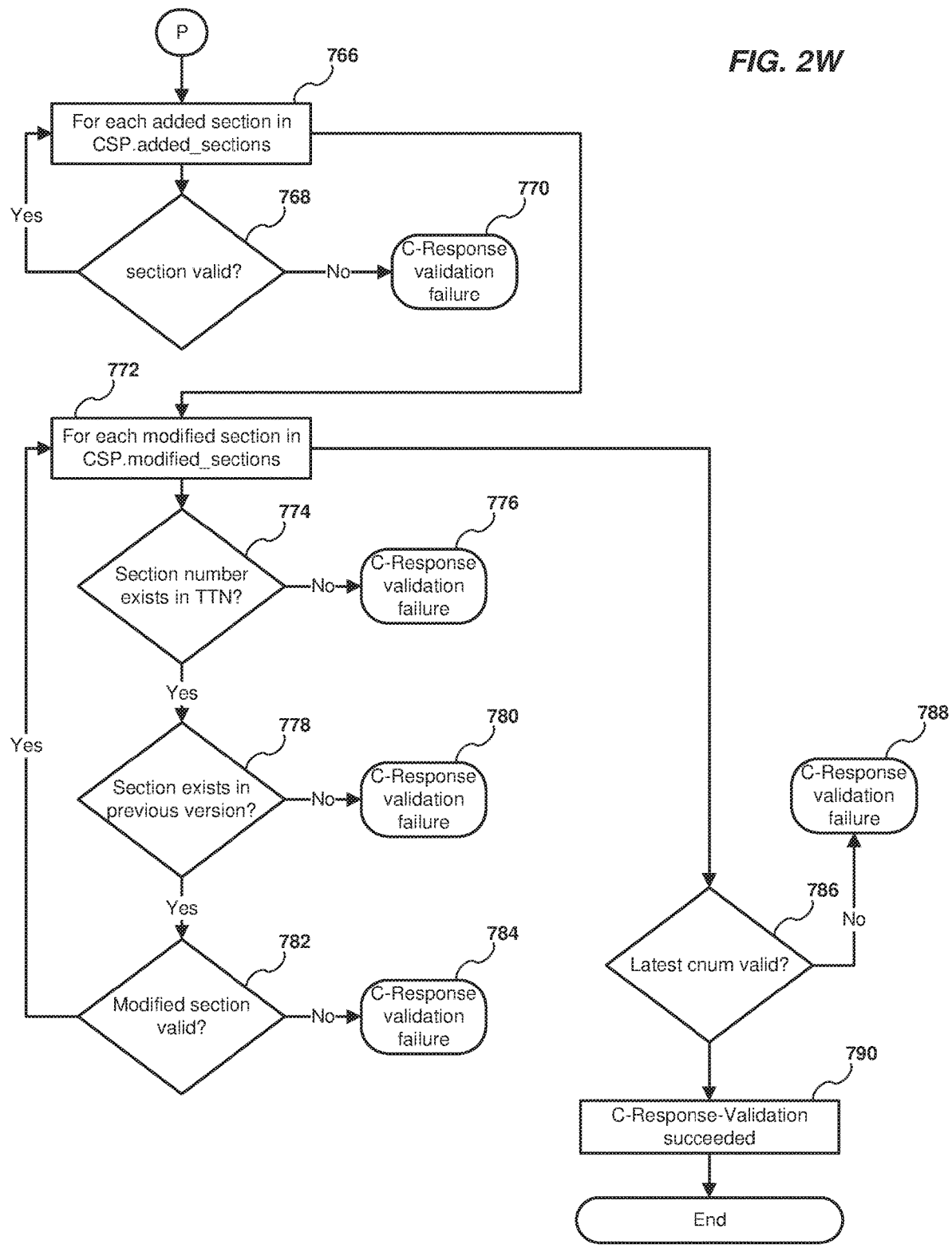

Referring to FIGS. 2A-2S are flow charts illustrating a method for certified confidential data collaboration in accordance with an embodiment of the present invention. A non-limiting flowchart relating to a C-send execution workflow 300 in accordance with an embodiment of the present invention is shown in FIGS. 2A-2C. At block 302, party$_1$ creates a changeset proposal (CSP). A check for whether an audit is enabled is performed at block 304. If audit is enabled, then at blocks 306 and 304, party$_1$ performs a cryptographic hash function on CSP to generate $CSP_H$ and write $CSP_H$ to the audit smart contract (ASC). Otherwise, if an audit is not enabled, then party$_1$ sends the CSP to a governor at block 310. A check for whether an audit is enabled is performed at block 312. This step may be alternatively combined with block 304 above. If audit is enabled, then at block 314, governor performs a cryptographic hash function on CSP to generate $CSP_H$. The governor uses ASC to find $CSP_H$ at block 316. At blocks 318 and 320, if the $CSP_H$ is not found, then the governor terminates the transaction [TERMINATE-EXECUTION-CSP-FAILED] with a Changeset-Proposal-Not-Verifiable. Otherwise, if the $CSP_H$ is found, then the governor creates a new thread tracking number (TTN) and performs a cryptographic hash function on TTN to generate $TTN_H$ at blocks 324 and 326. At blocks 328 and 330, the governor creates a state-at-changeset (SAC) by validating the CSP (SAC1=validate (CSP)). If the validation fails, then the governor terminates the transaction [TERMINATE-EXECUTION-VALIDATION-FAILED] at blocks 332 and 334. Otherwise, if the validation is successful, then the governor performs a cryptographic hash function on SAC to generate $SAC_H$ at block 336. At block 338, the governor computes the section SAC (SSAC=SAC.SectionsState). The governor performs a cryptographic hash function on SSAC to generate $SSAC_H$ at block 340. At block 342, the governor writes a fat twin record comprising [TTN, CS1, SAC] A governor will typically write the tat twin record to a transactional database that is owned and controlled by the governor. For each writer in SAC, the governor writes ChangesetRef notification comprising [TTN, CS1, writer] in the same transaction, at block 344. A governor can maintain inboxes for each user. These inboxes are different from email inboxes in that they contain only references to a changeset rather than a copy of the actual message or changeset. A governor can write [TTN, CS1, SAC] to the fat twin table(s) and a ChangesetRef [TTN, CS1, writer] to the inbox table in the same transaction. If the user has for instance a mobile app, then the governor could additionally send a push notification to the user's cell phone.

At blocks 346 and 348, if on-chain-payment then the payment amount party$_1$ is computed. If party$_1$ has an insufficient balance, then [TERMINATE-EXECUTION-INSUFFICIENT-BALANCE] occurs at blocks 350 and 352. At block 354, the governor creates a thin twin on the thin twin smart contract (TTSC) comprising [TTN$_H$, CS1, SAC$_H$, SSAC$_H$, CSP$_H$]. The thin twin smart contract is written into the Ethereum blockchain. An on-chain-payment determination is made at block 356. At blocks 358, 360 and 362, if on-chain-payment is true and party$_2$ is on-chain, then the payment amount to transfer from party$_1$ to governor, auditor and party$_2$ is computed, and the thin twin smart contract calls the coin smart contract (CSC) to transfer tokens from party$_1$ to the governor, auditor and party$_2$. Otherwise, at blocks 364 and 366, if on-chain-payment is true and party$_2$ is not on-chain, then the payment amount to transfer from party$_1$ to governor and auditor is computed, and the thin twin smart contract calls the coin smart contract (CSC) to transfer tokens from party$_1$ to the governor and auditor. The governor sends [#TTN, CS1, SAC, CSP] to party$_1$ and party$_2$. After the transaction is committed to the governor database, the governor sends [#TTN, CS1, SAC, CSP] to party$_1$ and party$_2$. Because a changeset is immutable, it does not need to be sent in the same transaction. There may be many reason for sending this information. For instance, if party$_1$ or party$_2$ need to later do a certification proof, then this information would need to be presented to an arbitrator or to the respective other party. Typically, the parties would just store the information for potential later use. The information may be sent in several forms, including without limitation a ZIP file form. Finally, [TERMINATE-C-SEND-SUCCEEDED] occurs.

A non-limiting flowchart relating to an C-send audit workflow 370 in accordance with an embodiment of the present invention is shown in FIGS. 2D-2E. At block 372, auditor VAP receives [CSPGov, TTN$_H$, CS1] from the governor. A cryptographic hash function is performed on CSPgov to generate CSPgov$_H$ at block 374. At block 376, the auditor VAP checks if the CSP$_H$ associated with [TTN$_H$, CS1] on the thin twin smart contract is the same as CSPgov$_H$. If false, then at blocks 378 and 380, the auditor VAP writes AUDIT-FAILED-UNVERIFIABLE-CSP on [#TTN, CS1] record in the thin twin smart contract and terminates with [TERMINATE-AUDIT-FAILED-UNVERIFIABLE-CSP]. The auditor performs a validation (SAC=validate(CSPgov)) at block 382. At blocks 384, 386 and 388, if validation fails, the auditor VAP writes AUDIT-FAILED-INVALID-OPERATION on [#TTN, CS1] record in the thin twin smart contract, and terminates with [TERMINATE-AUDIT-FAILED-INVALID-OPERATION]. At block 390, the auditor VAP computes the section state-of-changeset (SSAC=SAC.SectionsState). The auditor VAP performs a cryptographic hash function on SAC to generate SAC$_H$ at block 392. At block 394, the auditor VAP performs a cryptographic hash function on SSAC to generate SSAC$_H$. The auditor VAP checks SAC$_H$ and SSAC$_H$ associated with the [TTN$_H$, CS1] record in the thin twin smart contract is the same as the ones he computed at block 396. At blocks 398, 400 and 402, if false, then the auditor VAP writes AUDIT-FAILED-INVALID-SAC-HASH and terminates with [TERMINATE-AUDIT-FAILED-INVALID-SAC-HASH]. The auditor VAP writes AUDIT-PASSED to the [TTN$_H$, CS1] record in the thin twin smart contract at block 404 and terminates with TERMINATE-AUDIT-PASSED.

A non-limiting flowchart relating to a certification proof of a C-send workflow 410 in accordance with an embodiment of the present invention is shown in FIGS. 2F-2G. At block 412, party$_1$ sends [TTN$_H$, CS1, SAC, B] to Arbitrator VAP. Arbitrator VAP computes section SAC (SSAC=SAC.SectionsState) at block 414. At blocks 416 and 418, arbitrator VAP performs a cryptographic hash function on SAC to generate SAC$_H$ and performs a cryptographic hash function on SSAC to generate SSAC$_H$. Arbitrator VAP compares SAC$_H$ and SSAC$_H$ computed with corresponding versions in thin twin smart contract at [TTN$_H$, CS1] at block 420. At blocks 422, 424 and 426, if not the same, then the arbitrator VAP notifies party$_1$ and B that Certification has failed and terminates with [TERMINATE-CERTIFICATION-FAILED]. Arbitrator VAP checks if thin twin smart contract at [TTN$_H$, CS1] has an audit record at block 428. At blocks 430, 432 and 434, if yes, and audit record is in AUDIT-FAILED state then arbitrator VAP notifies party$_1$ and party$_2$ that certification has succeeded but there is an underlying AUDIT-FAIL, and terminates with [TERMINATE-CERTIFICATION-SUCCEEDED-WITH-AUDIT-FAIL-WARNING]. Arbitrator VAP notifies party$_1$ and party$_2$ that certification has succeeded and that [TTN$_H$, CS1, SAC] is non-repudiable and binding and terminates with [TERMINATE-C-SEND-CERTIFICATION-SUCCEEDED] at block 436.

A non-limiting flowchart relating to a C-forward execution workflow 440 in accordance with an embodiment of the present invention is shown in FIG. 2H. At block 442, party$_2$ creates CSP to C-forward TTN2.CS1-TTN2.CS5 and TTN1.CS4-TTN1.CS7. party$_2$ sends the CSP to governor at block 444. At block 446, the governor validates the CSP (SAC=validate(CSP, TTN2, TTN1)). In general, this is a recursive validation. Validation can fail for a variety of reasons, including without limitation the CSP has invalid structure [VALIDATION-FAILED-INVALID-CSP], party$_2$ does not have access to the TTN [VALIDATION-FAILED-NO-PERMISSION], the Changesets specified do not exist [VALIDATION-FAILED-CHANGESETS-DO-NOT-EXIST], or the Changeset is not a tail truncation [VALIDATION-FAILED-NOT-A-TAIL-TRUNCATION]. At block 452, the governor generates a new TTN (TTN3). The governor performs a cryptographic hash function on TTN3 to generate TTN3$_H$ at block 454. At block 456, the governor computes section SAC (SSAC=SAC.SectionsState). The governor performs a cryptographic hash function on SAC to generate SAC$_H$ and performs a cryptographic hash function on SSAC to generate SSAC$_H$, at blocks 458 and 460. At block 462, the governor writes fat twin [TTN, CS1, SAC]. For each writer in SAC, the governor writes ChangesetRef [TTN, CS1, writer] in same transaction at block 464. At block 466, the governor creates a thin twin using the thin twin smart contract [TTN3$_H$, CS1, SAC$_H$, SSAC$_H$]. The governor sends [TTN$_H$, CS1, SAC] to party$_2$ and party$_3$, and terminates with [TERMINATE-C-FORWARD-SUCCEEDED]. The governor can send to party$_2$ and party$_3$ in several forms. One form is a ZIP file form.

A non-limiting flowchart relating to a certification proof of a C-forward workflow 470 in accordance with an embodiment of the present invention is shown in FIGS. 2I-2K. At block 472, party$_2$ sends [TTN$_H$3, CS1, SAC, SSAC, C] to arbitrator VAP. Arbitrator VAP performs a cryptographic hash function on SAC to generate SAC$_H$ and performs a cryptographic hash function on SSAC to generate SSAC$_H$. at blocks 476 and 478. At block 480, arbitrator VAP compares these computed $SAC_H$ and $SSAC_H$ with the values on the thin twin at [$TTN_H$3, CS1]. If these values do not match, then arbitrator VAP notifies party$_2$ and party$_3$ that certification has failed and terminates with [TERMINATE-CERTIFICATION-FAILED], at blocks 482, 484 and 486. At block 488, arbitrator VAP computes ForwardedThread[ ]=SAC.ForwardedThreads. Arbitrator VAP recursively verifies the forwarded chain. Blocks 490-526 show the steps for each ForwardedTTN (FTTN) in ForwardedThread[ ]. At block 492, arbitrator VAP performs a cryptographic hash function on FTTN to generate $FTTN_H$. Arbitrator VAP finds $FTT_H$ in the thin twin smart contract at block 494. At blocks 496, 498 and 500, if $FTT_H$ cannot be found, then arbitrator VAP notifies party$_2$ and C that Certification has failed, and terminates with [TERMINATE-CERTIFICATION-FAILED-CANNOT-FIND-FORWARDED-THREAD]. Blocks 502-526 show the steps for each CSN in ForwardedThread [FTT]. At block 504, arbitrator VAP finds [$FTTN_H$, CSN] in thin twin smart contract. If Arbitrator VAP cannot find [$FTTN_H$, CSN], then the arbitrator VAP notifies party$_2$ and C that certification has failed and terminates with [TERMINATE-CERTIFICATION-FAILED-CANNOT-FIND-CHANGESET-IN-FORWARDED-THREAD], at blocks 506, 508 and 510. At block 512, arbitrator VAP computes FSAC=SAC.ForwardedSACs(FTT, CSN). Arbitrator VAP computes FSSAC=FSAC.SectionsState at block 514. At blocks 516 and 518, arbitrator VAP performs a cryptographic hash function on FSAC to generate $FSAC_H$ and performs a cryptographic hash function on FSSAC to generate $FSSAC_H$. A determination of whether $FSAC_H$ or $FSSAC_H$ do not match [$FTT_H$, CSN, $SAC_H$] or [$FTT_H$, CSN, $SSAC_H$] on the thin twin, at block 520. At blocks 522, 524 and 526, if they don't, arbitrator VAP notifies party$_2$ and party$_3$ that certification has failed and terminates with [TERMINATE-CERTIFICATION-FAILED-FORWARDED-THREAD-SACS-DONT-MATCH]. At block 528, arbitrator VAP notifies party$_2$ and party$_3$ that certification has succeeded and that [$TTN3_H$, CS1, SAC, SSAC] which includes [$TTN2_H$, CS1-CS5] and [$TTN1_H$, CS4-CS7] is non-repudiable and binding, and terminates with [TERMINATE-C-FORWARD-CERTIFICATION-SUCCEEDED].

A non-limiting flowchart relating to a C-update/C-respond execution workflow 530 in accordance with an embodiment of the present invention is shown in FIG. 2L. At block 532, party$_1$ creates CSP to C-respond to TTN. party$_1$ sends CSP to governor at block 534. At block 536, the governor validates CSP (SAC=validate(CSP, TTN)). Validation can fail for a variety of reasons, including without limitation if CSP has invalid structure [VALIDATION-FAILED-INVALID-CSP] or if party$_1$ does not have access to TTN [VALIDATION-FAILED-NO-PERMISSIONS], at blocks 538 and 540. At block 542, the governor computes section SAC (SSAC=SAC.SectionsState). The governor performs a cryptographic hash function on SAC to generate $SAC_H$ and performs a cryptographic hash function on SSAC to generate $SSAC_H$ at blocks 544 and 546. At block 548, the governor generates new CSN (CSX). The governor appends Changeset to fat twin [TTN, CSX, SAC] at block 550. At block 552, for each writer in SAC, the governor writes ChangesetRef [TTN, CSX, writer] in same transaction. The governor appends to thin twin via the thin twin smart contract [$TTN_H$, CSX, $SAC_H$, $SSAC_H$] at block 554. At block 556, the governor sends [$TTN_H$, CSX, SAC] to party$_1$ and all other writers at CSX and terminates with [TERMINATE-C-RESPOND-SUCCEEDED]. This can be sent in several forms. One form is a ZIP file form.

A non-limiting flowchart relating to a certification proof of a C-update/C-respond workflow 560 in accordance with an embodiment of the present invention is shown in FIG. 2M. At block 562, party$_1$ sends [$TTN_H$, CSX, SAC, SSAC, B] to arbitrator VAP. Arbitrator VAP performs a cryptographic hash function on SAC to generate $SAC_H$ and performs a cryptographic hash function on SSAC to generate $SSAC_H$ at blocks 566 and 568. At block 570, arbitrator VAP compares these computed $SAC_H$ and $SSAC_H$ with the values on the thin twin at [$TTN_H$, CSX]. If these values do not match, then the arbitrator VAP notifies party$_1$ and party$_2$ that Certification has failed and terminates with [TERMINATE-CERTIFICATION-FAILED], at blocks 572, 574 and 576. At block 578, arbitrator VAP notifies party$_1$ and party$_2$ that certification has succeeded and that [$TTN_H$, CSX, SAC, SSAC] response is non-repudiable and binding, and terminates with [TERMINATE-C-RESPOND-CERTIFICATION-SUCCEEDED].

A non-limiting flowchart relating to a C-instantiate execution workflow 580 in accordance with an embodiment of the present invention is shown in FIG. 2N. At block 582, party$_1$ creates CSP to C-instantiate template TTNT at ReleaseX. party$_1$ sends CSP to governor at block 584. At block 586 and governor validates CSP constructs SAC (SAC=instantiation-validate(CSP, TTNT, ReleaseX)). If valid, then the C-instantiate terminates at blocks 588 and 590. Validation can fail for a variety of reasons, including without limitation CSP has invalid structure [VALIDATION-FAILED-INVALID-CSP], TTNT does not exist [VALIDATION-FAILED-TEMPLATE-DOES-NOT-EXIST], TTNT/ReleaseX does not exist [VALIDATION-FAILED-TEMPLATE-RELEASE-DOES-NOT-EXIST], or party$_1$ does not have permissions to instantiate template TTNT [VALIDATION-FAILED-NO-INSTANTIATION-PERMISSION]. At block 592, the governor extracts the SectionsState from the SAC (SSAC). The governor performs a cryptographic hash function on SAC to generate $SAC_H$ and performs a cryptographic hash function on SSAC to generate $SSAC_H$. at blocks 594 and 596. At block 598, the governor generates a new thread tracking number TTNI. The governor generates a new fat twin of type Instance [TTNI, CS1, SAC] at block 602. At block 604, for each writer in SAC, the governor writes ChangesetRef notification [TTNI, CS1, writer] in same transaction. The governor creates a thin twin of type Instance via the thin twin smart contract [$TTNI_H$, CS1, $SAC_H$, $SSAC_H$] at block 606. At block 608, the governor sends [$TTNI_H$, CS1, SAC] to party$_1$ and all other writers in SAC. This can be sent in several forms. One form is a ZIP file form. The C-instantiate execution ends successfully with [TERMINATE-C-INSTANTIATE-SUCCEEDED] at block 610.

A non-limiting flowchart relating to a certification proof of C-instantiate workflow 620 in accordance with an embodiment of the present invention is shown in FIGS. 2O-2P. At block 622, party$_1$ sends [$TTNI_H$, CS1, SAC, SSAC, B] to Arbitrator VAP. Arbitrator VAP performs a cryptographic hash function on SAC to generate $SAC_H$ and performs a cryptographic hash function on SSAC to generate $SSAC_H$ at blocks 626 and 686. At block 630, the arbitrator VAP compares these computed $SAC_H$ and $SSAC_H$ with the corresponding values on the thin twin at [$TTNI_H$, CS1]. If these values do not match, then the Arbitrator VAP notifies party$_1$ and party$_2$ that certification has failed with [TERMINATE-CERTIFICATION-FAILED] at blocks 632, 634 and 636. At block 638, the arbitrator VAP extracts TTNT from SAC. The arbitrator VAP compares thin twin [$TTNT_H$, CS1].$SSAC_H$ with thin twin [$TTNI_H$, CS1]

.SSAC$_H$ at block 640. At blocks 642, 644 and 646, if these values do not match, then the arbitrator VAP notifies party$_1$ and party$_2$ that certification has failed with [TERMINATE-CERTIFICATION-FAILED-INSTANCE-SSAC-DIFFERENT-FROM-TEMPLATE-SSAC]. At block 648, the arbitrator VAP notifies party$_1$ and party$_2$ that certification has succeeded and that the C-instantiation represented by [TTNI$_H$, CS1, SAC, SSAC] is non-repudiable and binding. The certification successfully ends with [TERMINATE-C-INSTANTIATE-CERTIFICATION-SUCCEEDED] at block 650.

A non-limiting flowchart relating to a C-clone/C-TrueCopy execution workflow 660 in accordance with an embodiment of the present invention is shown in FIG. 2Q. At block 662, party$_1$ creates CSP to C-clone certified thread TTN1 at CSX. party$_1$ sends CSP to governor at block 664. At block 666, the governor validates CSP and constructs SAC (SAC=instantiation-validate(CSP, TTN, CSX)). If CSP is not valid, then the C-clone/C-TrueCopy fails validation at blocks 668 and 670. Validation can fail for a variety of reasons, including without limitation, the CSP has invalid structure [VALIDATION-FAILED-INVALID-CSP], TTN does not exist [VALIDATION-FAILED-THREAD-DOES-NOT-EXIST], TTNT/CSX does not exist [VALIDATION-FAILED-CSX-DOES-NOT-EXIST], or party$_1$ does not have access to TTN1 [VALIDATION-FAILED-NO-PERMISSION]. At block 672, the governor extracts (SectionsState) SSAC from SAC. The governor performs a cryptographic hash function on SAC to generate SAC$_H$ and performs a cryptographic hash function on SSAC to generate SSAC$_H$ at blocks 674 and 676. At block 678, the governor generates a new thread tracking number TTNclone. The governor generates a new fat twin of type Instance [TTNclone, CS1, SAC] at block 682. At block 684, for each writer in SAC, the governor writes ChangesetRef notification [TTNclone, CS1, writer] in same transaction. The governor creates a thin twin via the thin twin smart contract [TTNclone$_H$, CS1, SAC$_H$, SSAC$_H$] at block 686. At block 688, the governor sends [TTNclone$_H$, CS1, SAC] to party$_1$ and all other writers in SAC. This can be sent in several forms. One form is a ZIP file form. The C-clone/C-TrueCopy execution successfully ends with [TERMINATE-C-CLONE-SUCCEEDED] at block 690.

A non-limiting flowchart relating to a certification proof of C-clone/C-TrueCopy workflow 700 in accordance with an embodiment of the present invention is shown in FIGS. 2R-2S. At block 702, party$_1$ sends [#TTNclone, CS1, SAC, SSAC, party$_2$] to arbitrator VAP. Arbitrator VAP performs a cryptographic hash function on SAC to generate SAC$_H$ and performs a cryptographic hash function on SSAC to generate SSAC$_H$ at blocks 704 and 706. At block 708, the arbitrator VAP compares these computed SAC$_H$ and SSAC$_H$ with the corresponding values on the thin twin at [TTNclone$_H$, CS1]. If these values do not match, then the arbitrator VAP notifies party$_1$ and party$_2$ that certification has failed and terminates with [TERMINATE-CERTIFICATION-FAILED] at blocks 712 and 714. At block 716, arbitrator VAP extracts TTN1 from SAC. Arbitrator VAP compares thin twin [TTN1$_H$, CS1].SSAC$_H$ with thin twin [TTNclone$_H$, CS1].SSAC$_H$ at block 718. If these values do not match, then the arbitrator VAP notifies party$_1$ and party$_2$ that certification has failed and terminates with [TERMINATE-CERTIFICATION-FAILED-CLONE-SSAC-DIFFERENT-FROM-CLONED-SSAC] at blocks 720, 722 and 724. At block 726, the arbitrator VAP notifies party$_1$ and party$_2$ that certification has succeeded and that the C-clone represented by [TTNclone$_H$, CS1, SAC, SSAC] is non-repudiable and binding. The certification proof of C-clone/C-TrueCopy successfully ends with [TERMINATE-C-CLONE-CERTIFICATION-SUCCEEDED] at block 728.

A non-limiting flowchart relating to a C-response-validation workflow 730 in accordance with an embodiment of the present invention is shown in FIGS. 2T-2W. At blocks 732 and 734, if user does not exist, then the validation failed. If TTN does not exist or the user does not have access to TTN, then the validation failed, at blocks 736 and 738. At blocks 740 and 742, the current_csn is set to TTN.latest.csn and a determination is performed for if (NOT validate_comment (CSP.comment)), then the validation failed. For each attachment in CSP.attachments, a determination is made if (NOT validate_attachment(attachment)) and if not valid then the validation failed, at blocks 744, 746 and 748. At blocks 750, 752 and 756, for each writer in CSP.writers the writer structure is validated and the user exist validation occurs. If (NOT validate_writer_structure(writer)), then the validation failed, at blocks 752 and 754. At blocks 756 and 758, if (NOT user_exists(writer)), then the validation failed. For each deleted section in CSP.deleted_sections, then if section.section_num does not exist in this TTN, then the validation failed, at blocks 760, 762 and 764. At blocks 766, 768 and 770, for each added section in CSP.added_sections, the TYPE=section.type and if (NOT added_section_validate (TYPE, section)), then the validation failed. For each modified section in CSP.modified_sections, a section number validation, a section validation and a modified section validation occurs, at blocks 772, 774, and 782. At blocks 774 and 776, if section.section_num does not exist in this TTN, then the validation failed. If section does not have a previous version, then the validation failed, at blocks 778 and 780. At blocks 782 and 784, TYPE=section.type. and if (NOT modified_section_validate(TYPE, section, previous_version)), then the validation failed. If (CSP.expected_latest_cnum provided AND CSP.expected_latest_cnum !=current_csn), then the validation failed, at blocks 786 and 788. The C-response-validation successfully ends at block 790.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

This invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art, the invention may be embodied as a method, device, or computer program product. Accordingly, the present invention may take the form of an entirely hardware embodiment or an embodiment combining software and hardware aspects all generally referred to herein as a "circuit" or "module."

The present invention thus includes a computer program product which may be hosted on a computer-usable storage medium having computer-usable program code embodied in the medium and includes instructions which perform the processes set forth in the present specification. The storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Computer program code for carrying out operations of the present invention may be written in an object-oriented programming language such as Java®, Smalltalk, C# or C++. However, the computer program code for carrying out operations of the present invention may also be written in conventional procedural programming languages, such as the "C" programming language or in a visually oriented programming environment, such as VisualBasic.

The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Obviously, many other modifications and variations of the present invention are possible in light of the above teachings. The specific embodiments discussed herein are merely illustrative, and are not meant to limit the scope of the present invention in any manner. It is therefore to be understood that within the scope of the disclosed concept, the invention may be practiced otherwise then as specifically described.

The invention claimed is:

1. A method for providing certified confidential data collaboration between two or more of a plurality of parties where an established trust relationship is not required between the plurality of parties, the method comprising:
   creating, by a first party, a changeset proposal, the changeset proposal comprising a comment, a list of attachments, a list of parties, and a list of versioned and typed data sections;
   remotely performing, by the first party, a certified operation on a computer associated with a semi-trusted governor party and passing the changeset proposal to the certified operation;
   creating, by the semi-trusted governor party, a first globally unique changeset reference in a certified thread comprising a first globally unique thread tracking number and a related sequential changeset number;
   validating, by the semi-trusted governor party, the changeset proposal and creating, by the semi-trusted governor party, a state-at-changeset structure comprising the validated changeset proposal and a timestamp;
   extracting, by the semi-trusted governor party, a section-state-at-changeset structure from the changeset proposal, wherein the section-state-at-changeset structure is a subset of a total state of the list of versioned and typed data sections;
   performing, by the semi-trusted governor party, a cryptographic hash of the state-at-changeset structure;
   performing, by the semi-trusted governor party, a cryptographic hash of the section-state-at-changeset structure;
   writing, by the semi-trusted governor party, to a local transactional database a changeset fat twin record comprising the changeset reference and the associated state-at-changeset structure and section-state-at-changeset structure.
   communicating, by the semi-trusted governor party, a changeset reference notification for each fat twin record to each of the one or more parties;
   performing, by the semi-trusted governor party, the certified operation in a blockchain a certified thin twin smart contract and passing the changeset reference, the cryptographically hashed state-at-changeset structure and the cryptographically hashed section-state-at-changeset structure;
   validating, by the certified thin twin smart contract, that there does not exist a previous certified operation with the same changeset reference;
   writing by the thin twin smart contract to the blockchain a new thin twin record containing the changeset reference, the cryptographically hashed state-at-changeset structure and the cryptographically hashed section-state-at-changeset structure; and
   wherein the certified operation expressed by the changeset reference, the section-state-at-changeset structure including the timestamp and identities of the parties, and the state-at-changeset structure including the timestamp and a list of identities for each of the list of parties, occurred may be proved by each of the list of parties by:
   cryptographically hashing the state-at-changeset structure and the section-state-at-changeset structure associated with the certified operation; and
   performing a proof-of-certified-operation on the thin twin smart contract and passing the changeset reference, the cryptographically hashed state-at-changeset structure and cryptographically hashed state-at-changeset structure, wherein the proof may be determined even where the semi-trusted governor party is unresponsive after performance of the certified operation, and wherein the blockchain thin twin record constrains the semi-trusted governor party that becomes untrustworthy from re-issuing the certified operation with tampered timestamps, tampered identities, tampered attachments, tampered sections or tampered comment to one or more of the list of parties, the blockchain thin twin record constraining the ability of the semi-trusted governor party that is no longer trustworthy from re-issuing the certified operation with at least one selected from the group consisting of tampered timestamps, tampered identities, tampered attachments, tampered sections and tampered comment.

2. The method of claim 1, wherein the certified operation comprises:
   creating, by the semi-trusted governor party, a second globally unique changeset reference in a second certified thread comprising a created second globally unique thread tracking number and a related sequential changeset number, wherein the sequential changeset number is set to one;

performing, by the semi-trusted governor party, a cryptographic hash of the second globally unique thread tracking number; and validating, by the thin twin smart contract, that an existing thin twin does not exist with the same cryptographically hashed second globally unique thread tracking number; and creating, by the thin twin smart contract, a second thin twin record with the cryptographically hashed second globally unique thread tracking number.

3. The method of claim 2, wherein the remotely performed certified operation comprises a certified send operation, a blockchain operation is remotely performed, by the semi-trusted governor party, and comprises a certified send thin twin operation, and wherein the certified operation that may be proved at a later date comprises a certified send proof operation.

4. The method of claim 2, wherein the remotely performed certified operation comprises a certified forward operation, a blockchain operation is remotely performed, by the semi-trusted governor party, and comprises a certified forward thin twin operation;

wherein the validating, by the semi-trusted governor party, further comprises validating that the changeset proposal references an existing third certified thread, that the changeset proposal references a contiguous range of changesets and forwarded changesets in the third certified thread, and that the first party is contained within the list of parties of the third certified thread, and wherein the forwarded changesets in the third certified thread resulted from the previous certified forwarding of an eleventh certified thread which resulted from the certified forwarding of a tenth certified thread;

wherein the method further comprises creating, by the semi-trusted governor party, a set of new forwarded changesets in the second certified thread comprising a union of the referenced changesets from the third certified thread and the forwarded changesets from the third certified thread, comprising changesets from the previously certified forwarded tenth and eleventh certified threads, wherein each new forwarded changeset has a key which is a composite of the second thread tracking number, and at least one selected from the group consisting of the third thread tracking number, the tenth thread tracking number, the eleventh thread tracking number and the associated changeset number; and wherein the state-at-changeset structure in the second certified thread further includes the new forwarded changesets, and wherein the certified operation that may be proved at a later date comprises a certified forward proof operation and comprises validating that the cryptographic hash of the state-at-changeset structure of each forwarded changeset of the second certified thread is identical to the corresponding cryptographically hashed state-at-changeset structure on the blockchain, and that the cryptographically hashed state-at-changeset structure for each forwarded changeset in the second certified thread is identical to the corresponding cryptographically hashed state-at-changeset structure in at least one selected from the group consisting of the third certified thread, the tenth certified thread, and the eleventh certified thread on the blockchain, wherein the proof operation does not require any of the fat twin data of the entire chain of forwarded threads including the third certified thread, the tenth certified thread, and the eleventh certified thread, and does not require the cooperation of any party in the forwarding chain to prove that the changesets were forwarded without being tampered with by any intermediate party in the forwarding chain.

5. The method of claim 2, wherein the remotely performed certified operation comprises a certified template creation operation, a blockchain operation is remotely performed, by the semi-trusted governor party, and comprises a certified template creation thin twin operation, the certified operation that may be proved at a later date comprises a certified template creation proof operation, the second certified thread comprises a template type, and wherein the certified template is visible to and instantiable, but not manipulable, by a specified group of parties which is a superset of the list of parties in the second certified thread.

6. The method of claim 5, wherein the remotely performed certified operation comprises a certified instantiation operation, a blockchain operation is remotely performed, by the semi-trusted governor party, and comprises a certified instantiation thin twin operation, the certified operation that may be proved at a later date comprises a certified instantiation proof operation;

wherein the validating, by the semi-trusted governor party, further comprises validating that the changeset proposal references an existing changeset number in an existing fourth certified thread of the type template, the first party belongs to an instantiation group of the fouth certified thread of type template, that the changeset proposal section-state-at-changeset structure has identical value to that of the section-state-at-changeset structure of the fourth certified thread tracking at the referenced changeset number; and that the second certified thread is of type instance; and wherein the certified operation that may be proved at a later date comprises validating that the cryptographically hashed section-state-at-changeset structure first changeset of the second certified thread is the same as the cryptographically hashed section-state-at-changeset of the changeset of the fourth certified thread at the referenced changeset number on the blockchain, and wherein the proof does not require providing the fat twin data of the fourth certified thread changeset.

7. The method of claim 2, wherein the remotely performed certified operation comprises a certified drop operation, a blockchain operation is remotely performed, by the semi-trusted governor party, and comprises a certified drop thin twin operation, the certified operation that may be proved at a later date comprises a certified drop proof operation, and wherein the validating, by the governor, further comprises validating that there are no recipient parties.

8. The method of claim 2, wherein the remotely performed certified operation comprises a certified clone operation, a blockchain operation is remotely performed, by the semi-trusted governor party, and comprises a certified clone thin twin operation, the certified operation that may be proved at a later date comprises a certified clone proof operation;

wherein the validating, by the semi-trusted governor party, further comprising validations on the changeset proposal that the changeset proposal references an existing changeset number in an existing fifth certified thread, that the first party is party to the fifth certified thread, that the section-state-at-changeset structure of the changeset proposal has the same value as the section-state-at-changeset structure of the fifth certified thread at the referenced thread and changeset number; and wherein the certified operation that may be proved at a later date comprises validating that the cryptographically hashed section-state-at-changeset structure of the first changeset number of the second created thread is the same as the cryptographically hashed section-state-at-changeset of the fifth certified thread changeset at the referenced changeset number on the blockchain, and wherein the fat twin data of the fifth certified thread does not need to be provided.

9. The method of claim 1, wherein the changeset proposal references an existing thread tracking number if an existing sixth certified thread;

wherein the validating, by the semi-trusted governor party, further comprises validating that a certified thread with the same thread tracking number exists, and that sections in the changeset proposal that are to be modified or deleted already exist in the sixth certified thread; and wherein the method further comprising:

creating, by the semi-trusted governor party, a changeset with a changeset number one greater than the existing highest changeset number on the sixth certified thread;

validating, by the thin twin smart contract, that the passed in changeset number is one higher than the highest changeset number in the thin twin for the cryptographically hashed thread tracking number.

10. The method of claim 9, wherein the remotely performed certified operation comprises a certified respond operation, a blockchain operation is remotely performed, by the semi-trusted governor party, and comprises a certified respond thin twin operation, and wherein the certified operation that may be proved at a later date comprises a certified respond proof operation.

11. The method of claim 9, wherein the remotely performed certified operation comprises a certified read acknowledgement operation, a blockchain operation is remotely performed, by the semi-trusted governor party, and comprises a certified read acknowledgement thin twin operation, and wherein the certified operation that may be proved at a later date comprises a certified read acknowledgement proof operation; and wherein validating, by the semi-trusted governor party, further comprises validating that the changeset proposal includes a read-till changeset number, that the read-till changeset number exists in the sixth certified thread, and that the read-till changeset number is greater than any existing read-till changeset number in the sixth certified thread.

12. The method of claim 9, wherein the remotely performed certified operation comprises a certified receipt acknowledgement operation, a blockchain operation is remotely performed, by the semi-trusted governor party, and comprises a certified receipt acknowledgement thin twin operation, and wherein the certified operation that may be proved at a later date comprises a certified receipt acknowledgement proof operation; and wherein validating, by the semi-trusted governor party, further comprises validating that the changeset proposal includes a received-till changeset number, that the received-till changeset number exists in the sixth certified thread, and that the received-till changeset number is greater than any existing received-till changeset number in the sixth certified thread.

13. The method of claim 1, wherein the remotely performed certified operation comprises transferring a value amount represented by protocol tokens maintained on the blockchain;

wherein each party of the list of parties have a blockchain address, and a token balance on the blockchain is associated with each blockchain address;

wherein the first party pays for the operation using at least a fractional portion of tokens subtracted from the respective token balance;

wherein the at least a fractional portion of tokens is a sum of the at least a fractional portion of tokens paid to the semi-trusted governor party for a governor service, at least a fractional portion of tokens paid to each of the list of parties as an antispam fee to discourage spam and at least a fractional portion of tokens paid to value added parties for value added services associated with the certified operation; and wherein the tokens are paid by adding to the blockchain token balances of the respective recipient parties.

14. The method of claim 1, wherein to reduce the trust required in the semi-trusted governor party an auditor party independently:

audits the certified operation;

receives the changeset proposal from the semi-trusted governor party, validates the changeset proposal;

creates a second state-at-changeset structure;

extracts the section-state-at-changeset-structure;

performs a cryptographic hash of the state-at-changeset structure and section-state-at-changeset-structure to respectively create a second cryptographically hashed state-at-changeset structure and a second cryptographically hashed section-state-at-changeset-structure;

compares the second cryptographically hashed state-at-changeset structure and the second cryptographically hashed section-state-at-changeset-structure and against the respective cryptographically hashed state-at-changeset structure and the cryptographically hashed section-state-at-changeset-structure on the blockchain at the changeset reference;

remotely performs the audit smart contract on the blockchain and passing the changeset reference, wherein an audit-passed property is set to true if the comparisons are the equal and false if the comparisons are not equal; and writes by the audit smart contract method an audit smart contract record having a unique key, comprising the auditor blockchain address and the changeset reference, and the audit-passed property associated with the unique key to the blockchain, and wherein the certified operation is considered valid only when the audit-passed property associated with the changeset reference is true.

15. The method of claim 1, wherein the method further comprising:

re-encrypting by means of a proxy at least one selecting from the group consisting of the comment, at least one of the list of attachments, and at least one of the list of versioned and typed data sections, wherein the re-encrypting comprises of the first party generating, by the fist party, a symmetric encryption key associated with the changeset proposal;

encrypting the at least one selecting from the group consisting of the comment, at least one of the list of attachments, and at least one of the list of versioned and typed data sections using the symmetric encryption key to produce encrypted content;

encrypting the changeset key with a private key to produce an encrypted changeset key and for each of the list of parties producing a re-encryption key using the private key of the first party and public keys for each recipient party, wherein the encrypted content and encrypted changeset key and a list of re-encryption keys one for each of the recipient parties are included in in the changeset proposal passed to a semi-semi-trusted governor party;

producing, by the semi-semi-trusted governor party, a list of re-encrypted changeset keys utilizing the re-encryption keys;

communicating, by the semi-semi-trusted governor party, the list of re-encrypted changeset keys to the respective recipient parties;

extracting, by each of the respective recipient parties, using the symmetric encryption key the communicated re-encrypted changeset key; and decrypting the at least one selecting from the group consisting of the comment, at least one of the list of attachments, and at least one of the list of versioned and typed data sections using the symmetric encryption key.

16. The method of claim 1, wherein to reduce the trust required in the semi-trusted governor party to prove that the semi-trusted governor party performed an appropriate validation operation associated with the certified operation the method further comprises:

performing, by the semi-trusted governor party, a zero-knowledge succinct non-interactive argument of knowledge mechanism is utilized by the semi-trusted governor party;

performing, by the semi-trusted governor party, a zkProver operation associated with the certified operation to produce a proof that validating function was executed; and communicating, by the semi-trusted governor party, the proof to the thin twin smart contract certified operation; and performing, by the thin twin smart contract, a zkVerifier operation associated with the certified operation to verify that the appropriate validation operation was performed by the semi-trusted governor party and writing the thin twin record to the blockchain upon a successful verification.

17. The method of claim 1, wherein the semi-trusted governor party is decentralized and does not required to be trusted to execute the certified operation in a blockchain resident in a set of trusted enclave environments, wherein the trusted enclave environments performs the certified operation without revealing any confidential information and without requiring the semi-trusted governor party to be trusted.

18. The method of claim 1, wherein the method further comprising:

utilizing a blockchain-within-a-blockchain mechanism to address the low scalability of blockchain;

periodically grouping a list of certified operation thin twin records into a certified thin block;

writing the certified thin block to a decentralized file system;

generating a sequential certified block number;

cryptographically hashing the certified thin block;

calling a certified thin block smart contract on the thin block smart contract;

validating that the certified block number is one greater than the current highest certified block number;

writing the certified block number and cryptographically hashed certified thin block to the blockchain; and validating each of the certified thin blocks written to the decentralized file system to the prove of the certified operation.

19. The method of claim 1, wherein to eliminate orphaned blocks associated with blockchains, the method further comprising periodically validating, by the semi-trusted governor, whether a changeset reference is missing on the blockchain and re-communicating to the thin twin smart contract the changeset reference, the cryptographically hashed state-at-section structure and the cryptographically hashed section-state-at-changeset structure upon a successful validation, and wherein the thin twin smart contract allows changeset thin twin records to be written out of order while only allowing a thin twin record to be written only once on the main chain.

20. The method of claim 1, wherein the method further comprising:

creating, by the semi-trusted governor party, a decentralized backup of the changeset utilizing a decentralized file system, generating, by the semi-trusted governor party, during the certified operation a changeset symmetric encryption key;

encrypting the state-at-changeset structure with the changeset key;

writing the encrypted state-at-changeset structure to the decentralized file system which returns the decentralized file name;

providing the changeset key and decentralized file name associated with the changeset to each of the parties in the changeset proposal; and retrieving at a later time the encrypted state-at-changeset structure using the decentralized file name and decrypting the encrypted state-at-changeset structure using the changeset key to produce the state-at-changeset structure associated with the changeset reference.

21. The method of claim 1, wherein each of the parties have different roles with different permissions, a writer type party has read and write permissions, a commenter type party has read and write permission excluding write permissions to add, modify or delete sections, and wherein a reader type party has read permission but not write permission.

22. The method of claim 2, wherein the first party can restrict subsequent certified operations that are allowed on the second certified thread including disallowing any further certified operations, disallowing certified forwards of the second certified thread, disallowing certified clones of the second certified thread.

23. The method of claim 9, wherein the semi-trusted governor additionally computes a certified difference for all modified sections in the changeset proposal, wherein the semi-trusted governor retrieves the previous version of each modified section and computes a difference between the modified section and the previous version of the section, wherein the certified difference algorithm varies based on the type of section and the certified difference is added into the state-at-changeset and section-state-at-changeset structures.

24. The method of claim 1, wherein the method further comprising:

digitally signing, by the semi-trusted governor party, the fat twin record including the changeset reference and state-at-changeset structure;

communicating the digitally signed fat twin record to each of the parties; and utilizing at a later date the digitally signed fat twin record to prove that the certified operation occurred at a specified timestamp, content and identity.

25. The method of claim 4, wherein a notary value-added-party created the third certified thread, the method further comprising:

communicating, by the notary value-added-party, to the first party, the third certified thread including a single changeset with the comment, an attachment or an added section; and attesting, by the notary value-added-party, that the address associated with the first party is associated with the specified real world identity, wherein each of the parties in the second certified thread have trust in the notary value added provider party but are not required to trust the first party and can use the attesting to trust that the real world identity of the first party can be trusted.

26. The method of claim 1, wherein may be proved, wherein the proving, by an arbitrator value added party, the certified operation by submitting the fat twin record to the arbitrator value added party;

performing, by the arbitrator value added party, a proof operation; and asserting the certified operation represented by the submitted fat twin record whether the proof occurred.

27. The method of claim 1, wherein the method further comprising:

witnessing, by a neutral witness value added provider party, the certified operation;

storing locally the fat twin record associated with the certified operation; and proving on-demand that whether the certified operation as represented by the certified changeset reference occurred.

28. The method of claim 5, wherein the second certified thread of type template is published to a template store, the template store allowing the parties belonging to the specified group of parties to browse the store or search the store to find certified threads of type template matching desired criteria or functionality.

29. The method of claim 6, wherein the method further comprising validating on-demand, by a deep validation value-added-provider, the changeset proposal submitted to another party, wherein the deep validation value-added-provider by default creates the second certified thread of type template on which the certified instantiation operation is based, and wherein and the validating is specific to the existing changeset number in the existing fourth certified thread of the type template and the data from the second certified thread of type instance.

* * * * *